US007438082B2

(12) United States Patent  (10) Patent No.: US 7,438,082 B2
Klee  (45) Date of Patent: Oct. 21, 2008

(54) FROST-RESISTANT STAND VALVE

(75) Inventor: Klaus Klee, Rotenburg (DE)

(73) Assignee: Interforge Klee GmbH, Rotenburg, Wumme (DE)

( * ) Notice: Subject to any disclaimer, the term of this patent is extended or adjusted under 35 U.S.C. 154(b) by 0 days.

(21) Appl. No.: 11/431,971

(22) Filed: May 10, 2006

(65) Prior Publication Data
US 2006/0255658 A1 Nov. 16, 2006

(30) Foreign Application Priority Data
May 10, 2005 (DE) .................. 20 2005 007 628 U
Aug. 3, 2005 (EP) ................... 05016847

(51) Int. Cl.
E03B 9/14 (2006.01)
(52) U.S. Cl. ................. 137/301; 137/305; 137/883; 137/614.19
(58) Field of Classification Search ........... 137/305, 137/304, 302, 301, 614.19, 883, 625.2, 307, 137/308
See application file for complete search history.

(56) References Cited

U.S. PATENT DOCUMENTS

| 377,357 | A | * | 1/1888 | Hand .................. 137/305 |
| 1,863,919 | A | * | 6/1932 | Brooks ................. 137/305 |
| 2,234,635 | A | * | 3/1941 | Scott et al. ............ 137/304 |
| 2,819,926 | A |  | 1/1958 | Wood |
| 4,109,671 | A |  | 8/1978 | Hughes et al. |
| 6,532,986 | B1 |  | 3/2003 | Dickey et al. |

FOREIGN PATENT DOCUMENTS

| DE |  | 201 13 627 | U1 | 12/2001 |
| DE |  | 101 10 585 | C1 | 4/2002 |
| DE |  | 202 19 008 | U1 | 5/2004 |
| WO | WO 2004/094879 | A1 |  | 11/2004 |

* cited by examiner

Primary Examiner—Kevin L Lee
(74) Attorney, Agent, or Firm—Merchant & Gould P.C.

(57) ABSTRACT

The invention concerns a valve arrangement for external operation including: a feed opening, a delivery opening, a connecting passage which connects the feed opening to the delivery opening, a first valve which is adapted to enable the fluid connection through the connecting passage in a first functional position and to close same in a second functional position, and an actuating device for actuating the first valve. Valve arrangements of that kind suffer from the disadvantage that they are not suitable for frost-resistant operation as freezing water can damage parts of the valve arrangement. That disadvantage is overcome by the invention insofar as there is provided a second valve which is closed in the first and second functional position and which co-operates with a drain opening which is so connected to the connecting passage that in a third functional position in which the first valve is closed and the second valve is opened the liquid in the connecting passage can flow away through the drain opening. The first and the second valves can be in particular in the form of slide valves, in particular rotary slide valves and can preferably be integrated into a single slide valve.

26 Claims, 28 Drawing Sheets

FROST-RESISTANT STAND VALVE

BACKGROUND OF THE INVENTION

The invention concerns a valve arrangement for frost-resistant external operation including: a feed opening, a delivery opening, a connecting passage which connects the feed opening to the delivery opening, a first valve which is adapted to enable the fluid connection through the connecting passage in a first functional position and to close same in a second functional position, and an actuating device for actuating the first valve.

Valve arrangements for external operation, that is to say for regions which are exposed without protection to the weather and in particular to temperature fluctuations caused by the weather are known. They serve for example to provide water for caring for a garden in the external region of buildings or to provide water for watering plants in nurseries at various locations.

One problem with those valve arrangements is that those known valve arrangements are at risk from frost as the water disposed therein can freeze when the temperature falls below the freezing point and the water can then damage parts of the valve arrangement which are essential for operation thereof. In order to obviate such damage it is known for those valve arrangements to be shut off from the water supply prior to the onset of minus temperatures and then no longer use the valve arrangements at minus temperatures. That however is not satisfactory as it means that a considerable degree of complication and expenditure must be involved for the provision of water from other frost-resistant sources.

It is known from the field of hydrant technology to provide a valve which is sunk to a sufficient depth in the ground and which is actuated with a wrench or key which can be introduced into the hole in which the valve is sunk. That valve is at such a depth that usually there is no fear of its freezing even at minus air temperatures and consequently frost-resistant external operation thereof is possible. However that valve can only be actuated in a very awkward and involved manner and furthermore there is always the risk that, after actuation, water may still remain in the pipe leading out of the ground and that water freezes at minus temperatures and then results in damage to the valve arrangement.

DE 202 19 008 U discloses a frost-resistant valve arrangement which is suitable for fitment in a passage through an external wall of a building. In that valve arrangement the closure valve is disposed in the interior of the building, that is to say in the region which is safe from frost, and can be opened and closed by an actuating device which is in the external region. When the valve is closed that valve arrangement is emptied into the external region through the delivery opening so that in the closed condition there is no water in the valve arrangement. That valve arrangement allows frost-resistant operation but it can only be installed in a horizontal position. There is therefore a need for a frost-resistant valve arrangement which can be installed in any position, in particular in a perpendicular position, and which in particular is also not reliant on being installed in the wall of a building.

SUMMARY OF THE INVENTION

In accordance with the invention that need is satisfied by a valve arrangement of the kind set forth in the opening part of this specification, which is developed by a second valve which is closed in the first and second functional position and which co-operates with a drain opening which is so connected to the connecting passage that in a third functional position in which the first valve is closed and the second valve is opened the liquid in the connecting passage can flow away through the drain opening.

The valve arrangement according to the invention makes it possible for the water to flow away out of the valve arrangement through the drain opening when the first valve is closed and thereby after passing through the second functional position the second valve is opened in the third functional position. Drainage of the water from the valve arrangement in that way is guaranteed even when the valve arrangement and therefore in particular the connecting passage is installed in an orientation in which it extends in a vertical direction. In those positions of installation, in the case of the known valve arrangements it was generally not possible for a discharge of water to take place through the delivery opening arranged at the upper end, and consequently it was not possible to achieve a condition of being safe from frost.

In that way the valve arrangement according to the invention permits reliable removal of water from or venting of the interior of the valve arrangement and furthermore ensures that, upon the removal of liquid by way of the valve arrangement, no liquid is lost through the drain opening.

It is preferred if the first valve includes a first valve seat and a first valve body and the actuating device is connected to the first valve body by way of a first elastic element. In that way there is not a rigid connection between the first valve and the actuating device but the actuating device does not afford the user a fixed stop when the first valve was closed and the second functional position was reached. Instead, after the first valve is closed, the actuating device can be further actuated, in which case the elastic element is stressed. That makes it possible in particular to make a simple and reliable distinction between the second and the third functional positions as, between those two functional positions, the actuating device can be further actuated against the force of the elastic intermediate element.

It is further preferred that the second valve includes a second valve seat and a second valve body and is urged into the closed position by means of a second elastic element. In that way the second valve is urged into the safe operative position in which no liquid can unintentionally escape from the valve arrangement and consequently the operational reliability of the valve arrangement according to the invention can be enhanced. The first and the second elastic elements can preferably be coil springs which are in the form of tension springs or compression springs. It is however also possible to envisage other design configurations such as elastomer springs, plate springs, spiral springs or the like.

It is further preferred if the second valve co-operates with the actuating device in such a way that it is movable into the open position by means of the actuating device, preferably after the first valve has been moved into the closed position by means of the actuating device. That provides for reliably removing water from the valve arrangement by operation of the actuating device and in particular that arrangement prevents a different fluid from that which remains in the valve arrangement after closure of the first valve being drained away through the drain opening.

It is further preferred if there is provided a first elastic element of the above-described kind and the second valve co-operates with the actuating device in accordance with the above-specified manner if the second valve is movable into the open position by means of the actuating device, with bracing of the first elastic element. In that way the actuating device can firstly be actuated without bracing the first elastic element in order to move the first valve out of the open position into the closed position and thereafter the actuating device can be further actuated in the same direction, in which case operation is implemented against the elastic force of the first elastic element and that elastic element is elastically deformed in order thereby to open the second valve and consequently move out of the second functional position into the third functional position of the valve arrangement according to the invention.

It is further advantageous if the first valve and the second valve are in the form of slide valves, in particular rotary slide valves.

That development enjoys a series of advantages. The valve arrangement according to the invention has a tendency to still discharge small amounts of liquid through the delivery opening in the third valve position in order to provide that all parts of the connecting passage are emptied. That emptying effect however is interpreted by many users as meaning that the valve arrangement is not completely closed and therefore the actuating device is actuated with the application of an increased amount of force in order to completely seal off the valve arrangement. That misoperation can lead to premature failure of the valve seals and the service life of the valve arrangement is reduced thereby. That disadvantage can be overcome by making the first and second valves in the form of slide valves. A slide valve has typically defined operating positions which, in the case of a rotary slide valve, for example, are in the form of defined angular positions. That design configuration prevents a user from wrongly assuming that the valve has not been completely closed as the user can recognise that beyond all doubt by virtue of the defined position, visually or by feel.

A further advantage of the valve being in the form of a slide valve is that slide valves generally permit reliable operation which ensures that the valve is safely sealed off over a long period of operation.

In principle the first valve can be integrated into a first slide valve and the second valve can be integrated into a second slide valve, the slide valves being coupled in a suitable fashion in order to be able to set the first, second and third functional positions by means of the actuating device. It is however particularly preferred if the first and second valves are integrated into a single slide valve, in particular into a rotary slide valve. A slide valve can in principle be so designed that a plurality of functional positions can be set by the slide valve. Therefore the development having the slide valve is suitable in particular for integrating the first and second valves into a single slide valve in order in that way to provide all functional positions for the valve arrangement according to the invention by the actuation of a single slide valve. That permits a structurally particularly reliable and dependable design and allows a reduction in the number of moving parts and components overall of the valve arrangement according to the invention.

Integration of the first and second valves into a single slide valve can be effected in particular by the slide valve including a first valve element having a first through-flow opening and a second through-flow opening and a second valve element which is movable relative to the first valve element and has at least one opening for producing a fluid communication through one of the through-flow openings in the first valve element, wherein the first and second valve elements are so designed that the first through-flow opening of the first valve element is open in the first functional position, both through-flow openings of the first valve element are closed in the second functional position, and the second through-flow opening of the first valve element is open in the third functional position.

That embodiment allows the slide valve to be of a particularly compact configuration and permits the first and second valves to be designed in the form of a single slide valve, which is particularly inexpensive and involves a low level of wear. The first valve element can preferably be of a disc-shaped configuration and the first and second through-flow openings can be aligned in the axial direction. The first and second through-flow openings can in particular be arranged in such a way that there is between them a spacing which is larger than the dimensions of the eccentric opening in the second valve element. In that way it is easily possible to ensure that the first and second through-flow openings are not both open in any arrangement of the first valve element in relation to the second valve element. That embodiment is suitable in particular for the valve to be in the form of a rotary slide valve, in which case preferably the two valve elements are in the form of disc-shaped elements and the actuating device acts on the second valve element which is rotatable and has an eccentric opening.

It is further advantageous if the first valve element and the second valve element are at the same axial spacing relative to each other in the first and second and preferably also third functional positions, wherein in particular the first valve element is in the form of a disc with at least two eccentric openings. In that case one of the two eccentric openings can be in communication with the feed connection and the other of the two eccentric openings can be in communication with the drain opening. In that way it is possible to change between the first and the third functional positions by the second valve element being moved in such a way that on the one hand the one eccentric opening and on the other hand the other eccentric opening is switched into a condition of fluid communication with respect to the delivery opening, preferably by rotation of the second valve element through about 90° or 180°.

It is further preferred if the two eccentric openings of the first valve element are displaced through 180° relative to each other.

A further advantageous development of the valve arrangement according to the invention provides that the slide valve has at least one valve element comprising a ceramic material, preferably two valve elements of a ceramic material. That provides for particularly wear-free operation due to the high wearing strength of ceramic materials.

It is particularly preferred that the actuating device must be pivoted through about 90° in each case in order to pass from the one functional position into another functional position. That mode of operation is to be grasped intuitively from the point of view of a user. The mode of operation can be implemented in various ways. Thus it is possible to switch for example from the second functional position into the first functional position by pivoting the actuating device through 90° in a first direction and to shift from the second functional position into the third functional position by pivoting the actuating device through 90° in the other direction. In another fashion, it is possible to switch over from the second functional position into the first functional position by pivoting the actuating device through 90° in one direction while the switch from the first functional position into the third functional position can be effected by pivotal movement through 90° in the same direction so that in that case a pivotal movement through 180° must take place between the second and third functional positions. Other modes of function will be readily apparent to the man skilled in the art and he can easily carry them into effect.

In that respect it can be provided in particular that the actuating device must be pivoted through about 90° in order to pass from the first to the second functional position and must be pivoted through a further 90° in order to pass from the second to the third functional position.

A further development of the valve arrangement according to the invention can provide the valve arrangement is designed for installation in a horizontal ground surface and has an upper valve arrangement portion in which an upper valve passage portion, the delivery opening and preferably the actuating device are arranged, and a lower valve arrangement portion in which the feed opening, the drain opening and preferably the first and second valves are arranged. In that embodiment the functional elements which are at particular risk from frost are arranged in the lower valve portion and consequently, when the valve is installed in a horizontal ground surface, they can be disposed at such a depth that they are in the region which is safe from frost. That further increases the frost resistance of the valve arrangement. In particular that provides a valve arrangement which can be fitted into the ground with the connecting passage in an upright position, in which case the actuating device, that is to say in particular a rotary handle or the like, and the delivery opening are arranged at an agreeable operating height for a user above the ground and the components of the valve arrangement, which are important for its function and which are at risk from frost, are arranged in the ground at a depth at which they are safe from frost.

In that respect it is particularly preferred if the lower valve arrangement portion is so long that the feed opening in the installation position is arranged at about 80 cm depth in the ground. The depth of 80 cm is viewed as a depth which makes the arrangement safe from frost, according to standardisation, in Central European latitudes. In many cases a depth of only 60 cm is also adequate for frost-proof operation.

It is further preferred if the actuating device has a manually actuable handle element which is connected to the first valve by means of a connecting rod extending through a part of the connecting passage. That embodiment provides for a particularly compact and robust configuration for the valve arrangement and in addition permits the design to be particularly slender as, besides the connecting passage, no further components have to extend out of the ground when the arrangement is installed in the ground.

A further development of the valve arrangement according to the invention provides that provided in the upper region of the valve arrangement is a venting opening which allows an access of ambient air into the connecting passage for the purposes of emptying the liquid out of the passage through the drain opening. In principle admittedly venting of the inner valve arrangement can be effected by way of the delivery opening in many positions of installation and consequently emptying of the liquid through the drain opening can be made possible. In some installation positions and in some embodiments however it is advantageous if there is a venting opening which is disposed in the upper region of the valve arrangement and which compensates for the reduced pressure when the liquid is emptied through the drain opening, insofar as it makes it possible for ambient air to pass into the interior of the valve arrangement.

In that respect it is particularly advantageous if the venting opening co-operates with a third valve which closes the venting opening when there is an increased pressure in the connecting passage. That prevents liquid from passing to the exterior through the venting opening when the valve arrangement is in the first functional position. In accordance with the invention the third valve is preferably in the form of an automatically opening and closing valve which opens and closes respectively in dependence on the internal pressure in the valve arrangement. However an embodiment in which the third valve is also opened by the actuating device when the second or third functional position is set is also advantageous in certain cases.

In particular it is advantageous in regard to the two above-indicated embodiments if the third valve includes a third valve seat and a third valve body and is urged into the open position by means of a third elastic element. That ensures that the venting opening is reliably opened. In that case the third elastic element must be so designed that it exerts a weaker force towards the open position on the valve than the internal pressure in the valve arrangement exerts into the closed position in the first functional position of the valve arrangement.

A further preferred embodiment is distinguished by a first return flow check device arranged between the feed opening and the first valve to prevent the access of dirty water from the valve arrangement into the feed opening. That embodiment is advantageous if the valve arrangement is connected to a drinking water pipe in order thereby to prevent dirty water from passing into the drinking water pipe. In that case the return flow check device can be in the form of a non-return valve or the like.

It is further advantageous if there is provided a second return flow check device arranged between the drain opening and the second valve to prevent the access of dirty water from the environment into the valve arrangement. That ensures that the valve arrangement is not contaminated in its interior by dirty water which enters through the drain opening. The second return flow check device can in that case also be in the form of a non-return valve or the like.

In that respect however it is particularly preferred if the second return flow check device includes a valve float body which is adapted to float up upon access of water through the drain opening and to be pressed in sealing relationship against a valve seat. That provides for simple and reliable sealing of the interior of the valve arrangement against the access of dirty water through the drain opening.

Finally a further aspect of the invention is a method of venting a valve arrangement for frost-resistant external operation wherein in a functional position of the valve arrangement in which a first valve is closed, which connects a feed opening to a delivery opening of the valve arrangement, a second valve is opened which co-operates with a drain opening which is so connected to the connecting passage that in the third functional position the liquid in the connecting passage flows away through the drain opening. The method according to the invention permits efficient emptying of a valve arrangement after the removal of liquid through the valve arrangement and can thus permit frost-resistant operation of the valve arrangement.

BRIEF DESCRIPTION OF THE DRAWINGS

Preferred embodiments of the invention are described with reference to the Figures in which.

DETAILED DESCRIPTION OF THE PREFERRED EMBODIMENTS

Figure 4:
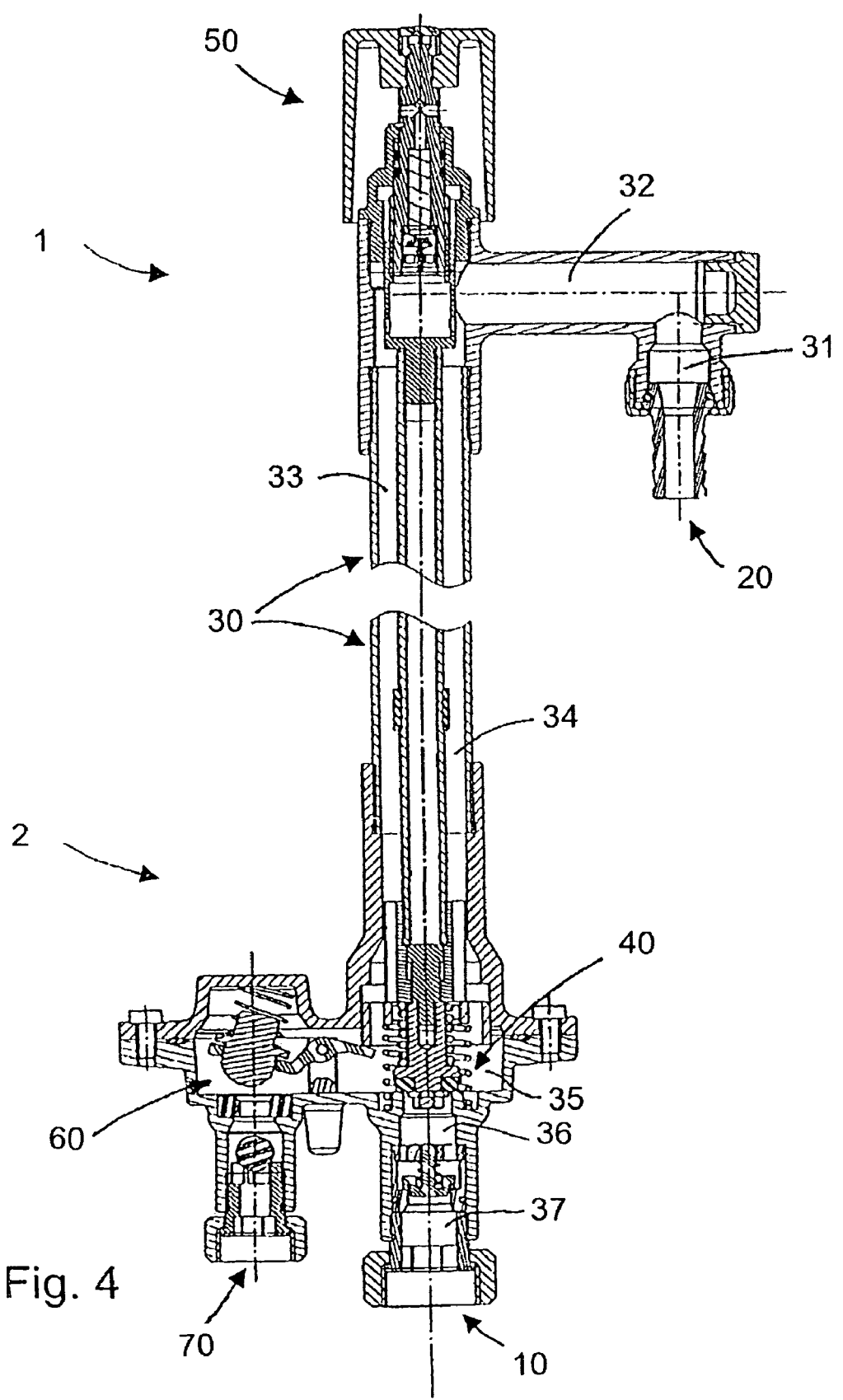
FIG. 4 shows an interrupted overall view in longitudinal section of a first embodiment of the valve arrangement according to the invention in the third functional position.
Figure 5:
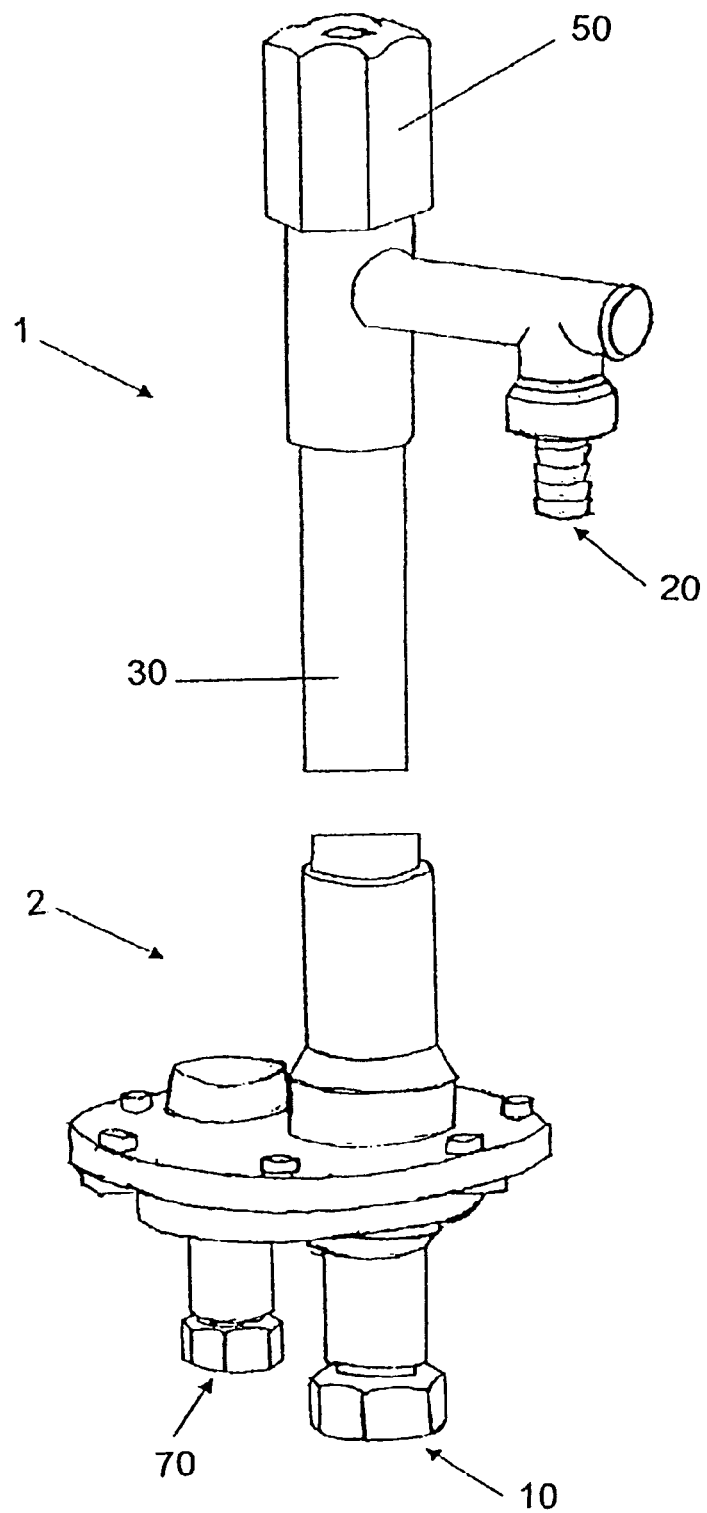
FIG. 5 shows a perspective view inclinedly from above and from the front of a first embodiment of the valve arrangement according to the invention.

Referring firstly to FIGS. 4 and 5 the valve arrangement according to the invention includes an upper portion 1 and a lower portion 2.

Arranged in the upper valve arrangement portion 1 is a delivery opening 20 and an actuating device 50, as well as a connecting passage 30 with upper connecting passage portions 31-33.

Arranged in the lower valve arrangement portion 2 is a feed opening 10, a first valve 40, a drain opening 70 and a second valve 60 as well as lower connecting passage portions 34-37 of the connecting passage 30.

Figure 1A:
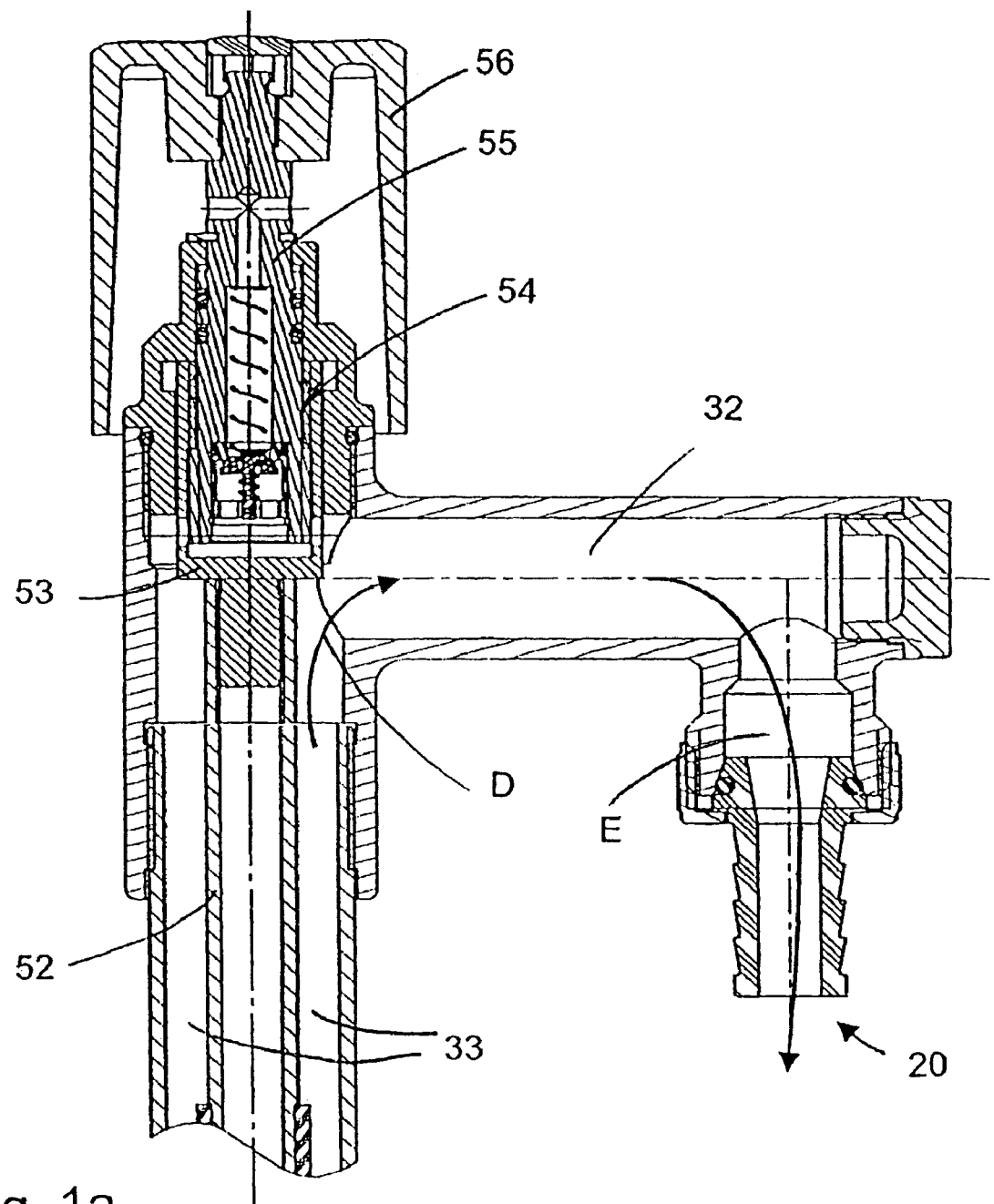
FIG. 1a is a side view in longitudinal section of the upper part of a first embodiment of the valve arrangement according to the invention in a first functional position.
Figure 1B:
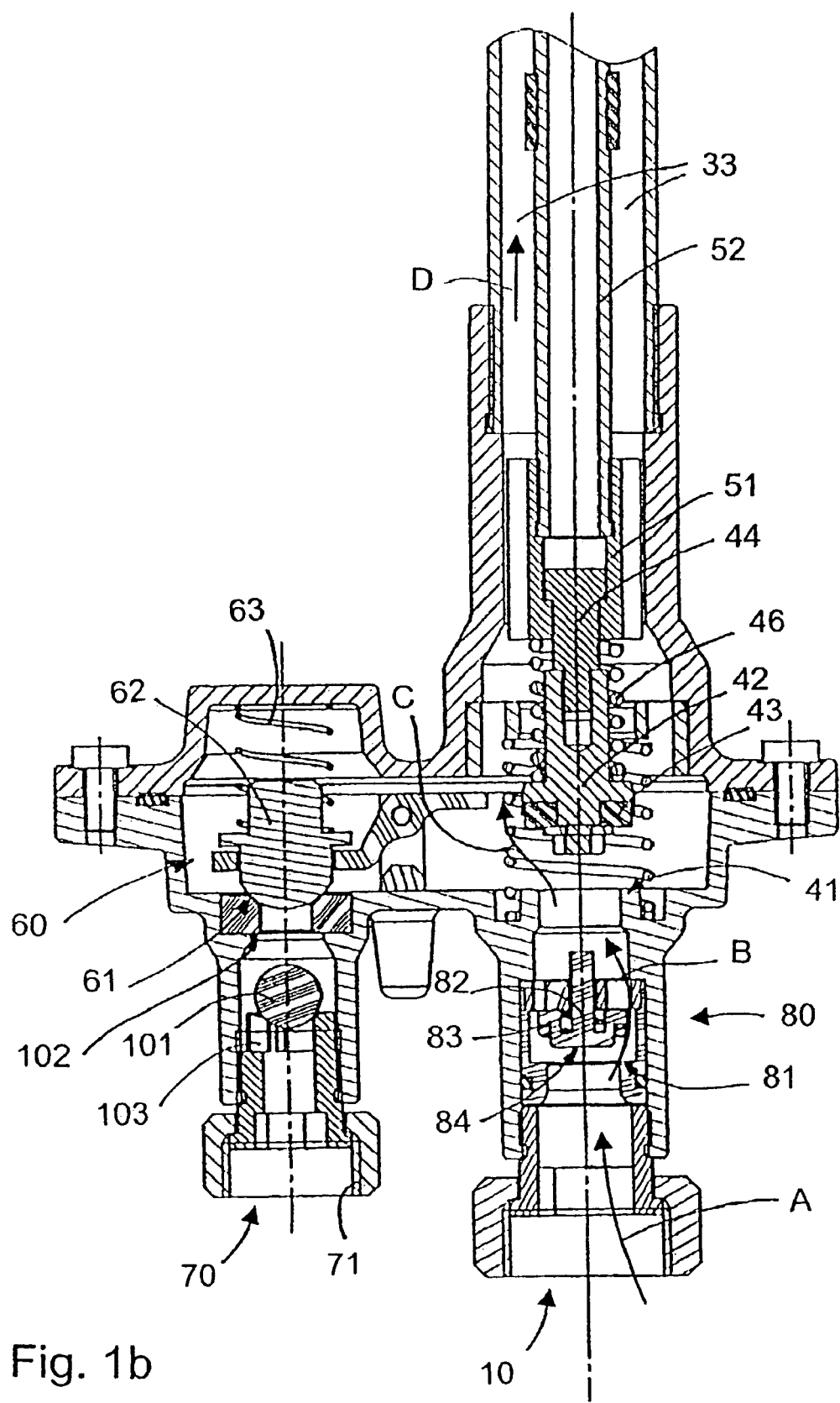
FIG. 1b shows a side view in longitudinal section of the lower part of the valve arrangement according to the invention in the first functional position.

FIGS. 1a and 1b show the valve arrangement in a first functional position in which water can flow from the feed opening through the connecting passage 30 and can be discharged from the delivery opening 20.

For that purpose the water flows through the feed opening 10 in a vertical direction into the valve arrangement. It then passes a check valve 80 which is arranged downstream of the feed opening. The check valve 80 includes a valve seat 81 into which a valve body 82 is urged by means of a coil spring 83. The water pressure applies to the valve body surface 84 a force acting against the coil spring 83 and thereby lifts the valve body 82 off the valve body seat 81, thereby permitting a feed flow of liquid. The water then further flows in the direction of the first valve 40, as indicated by the arrow B.

The first valve 40 includes a valve body seat 41 and a valve body 42 with a sealing element 43. The valve body 42 is screwed to a bolt 44 which is axially slidably fitted in an intermediate sleeve 51, at the end of the bolt which is opposite to the screwthread. The bolt 44 is urged into the lower position shown in FIG. 1b by a coil spring which extends between the intermediate sleeve 51 and the valve body 42. The intermediate sleeve 51 is in turn screwed to an actuating rod 52 at its first lower end. The actuating rod 52 is screwed to an adaptor portion 53 at its second upper end.

The adaptor portion 53 can be displaced in the axial direction by means of an actuating screwthread 54 which is provided between the adaptor portion 53 and an actuating spindle 55, when the actuating spindle 55 is rotated. For convenient and comfortable operation, a rotary handle 56 is connected to the actuating spindle 55 fixedly for the transmission of a turning moment.

In FIGS. 1a and 1b the adaptor portion 53 is moved by means of the screwthread 54 into the uppermost position so that the valve body 42 is lifted off the valve body seat 41 by means of the actuating rod 52 and the through flow as identified by the arrow C is enabled. In that way the water flows through the first valve 40 and can flow upwardly through the annular connecting passage 30 (as shown by the arrow D) and can be delivered out of the delivery opening 20 (shown by the arrow E).

A second valve 60 including a valve body seat 61 and a valve body 62 is urged into the closed position by a coil spring 63 in the first functional position shown in FIGS. 1a and 1b. That prevents water from issuing from the valve arrangement through a drain opening 70.

Figure 2A:
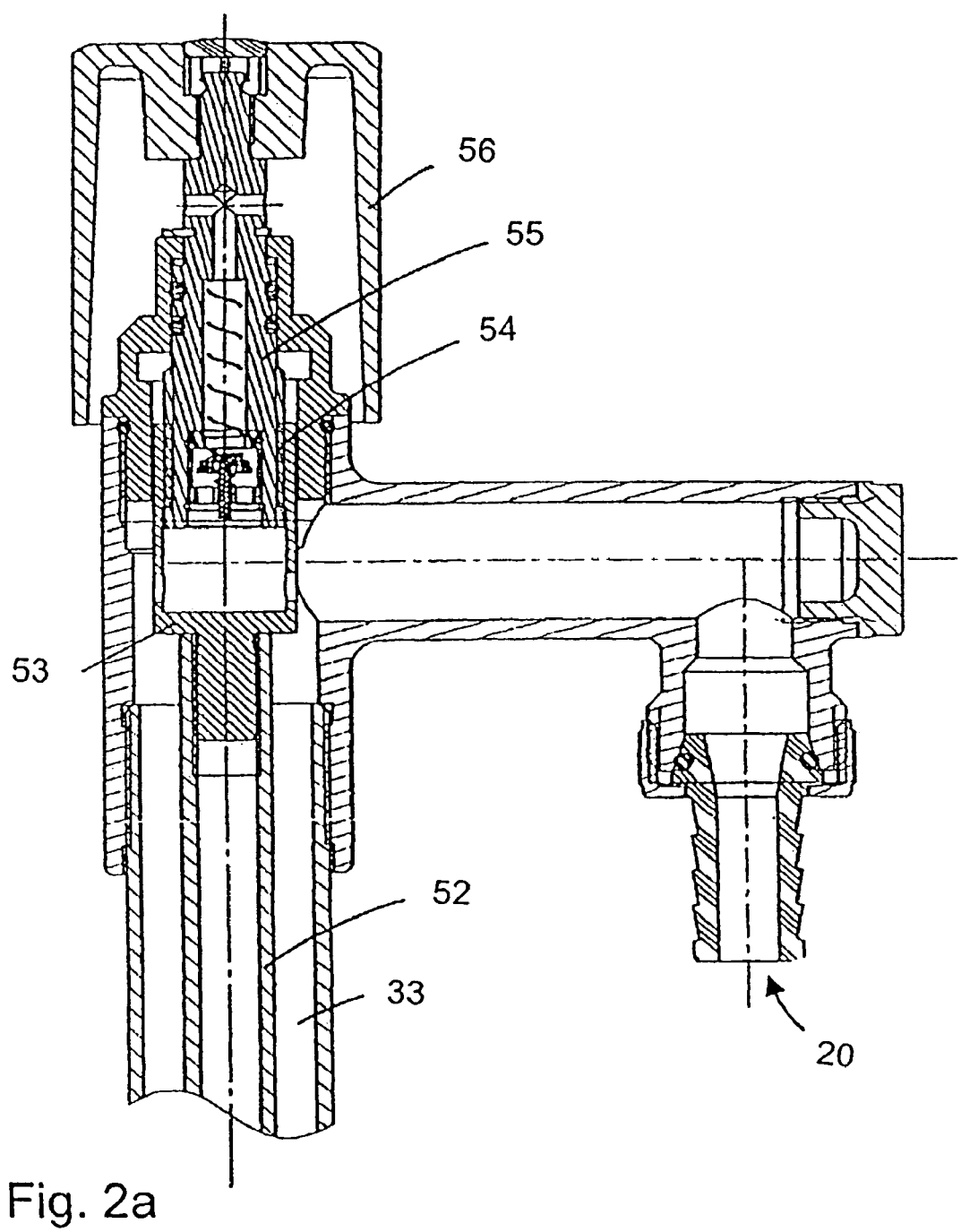
FIG. 2a shows a view corresponding to FIG. 1a in a second functional position.
Figure 2B:
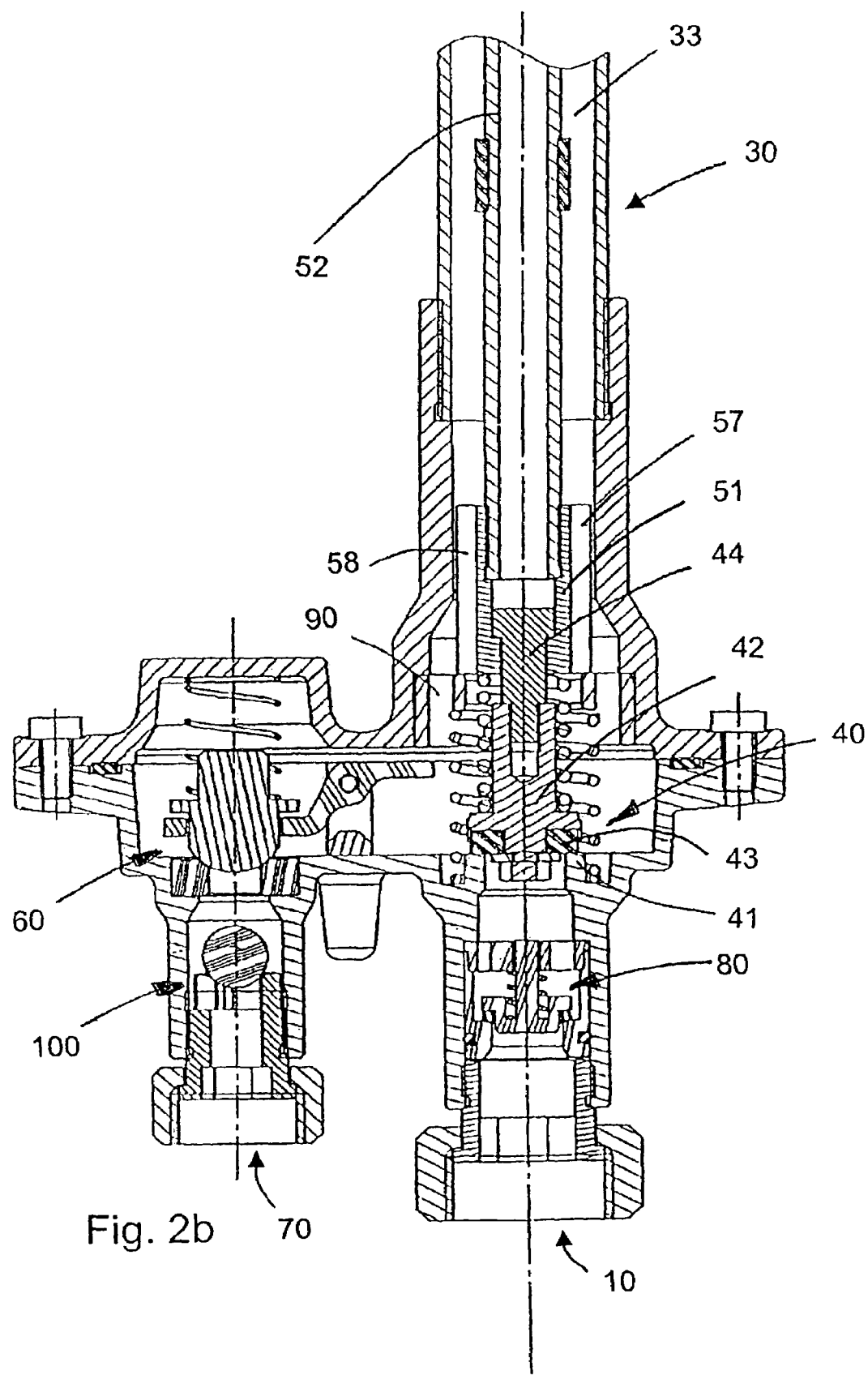
FIG. 2b shows a view corresponding to FIG. 1b in the second functional position.

FIGS. 2a and 2b show the valve arrangement according to the invention in a second functional position. In that second functional position the adaptor portion 53 has been moved downwardly by virtue of rotation of the rotary handle 56 by means of the screwthread 54 so that the valve body 42 with its sealing element 43 bears in sealing relationship against the valve body seat 41. In that second functional position the feed flow of water through the first valve 40 is prevented and consequently no water can flow from the feed opening 10 to the delivery opening 20.

In the second functional position the second valve is further urged into the closed position by the coil spring 43 so that no water can also flow out through the drain opening 70.

Figure 3A:
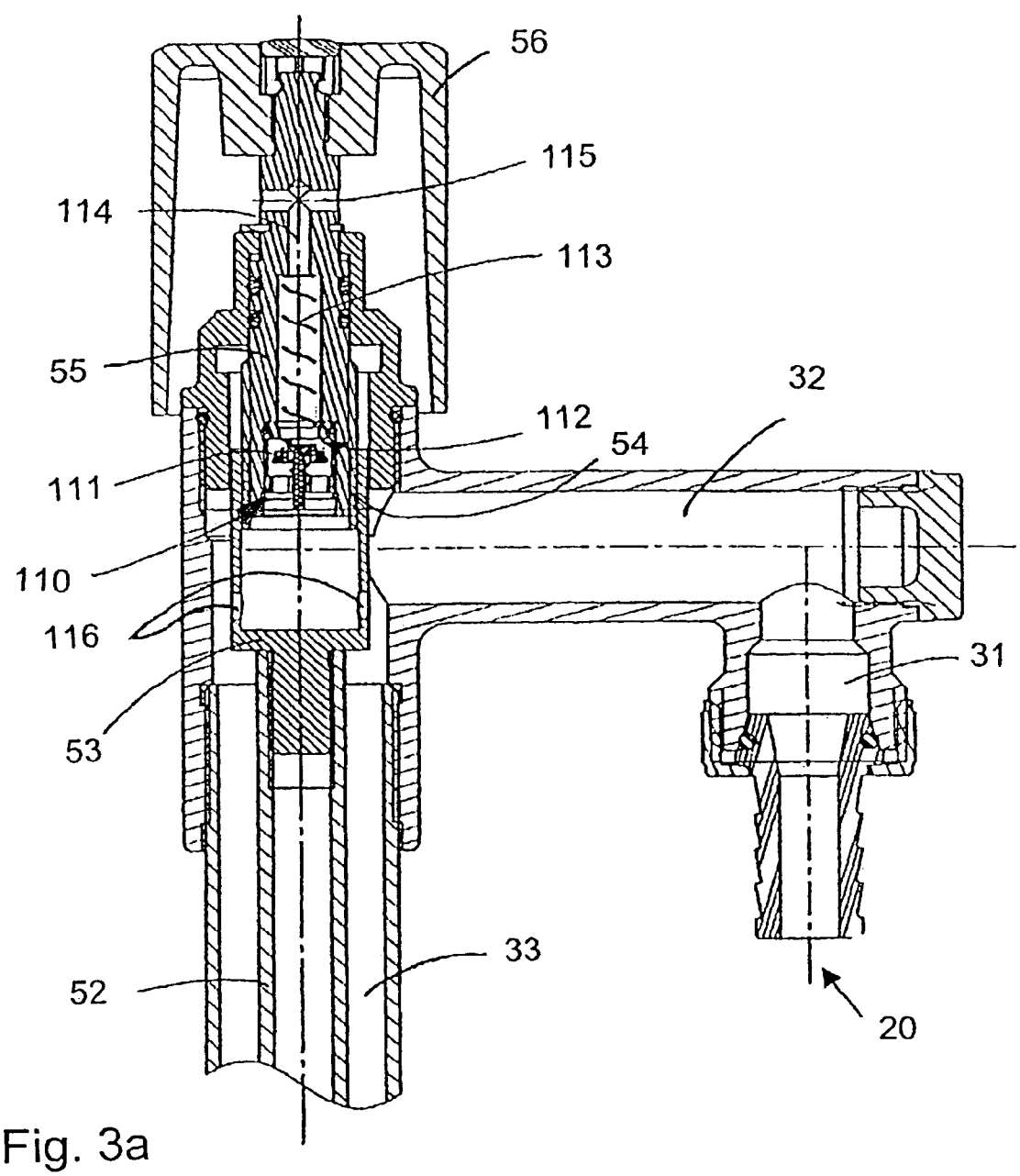
FIG. 3a shows a view corresponding to FIG. 1a in a third functional position.
Figure 3B:
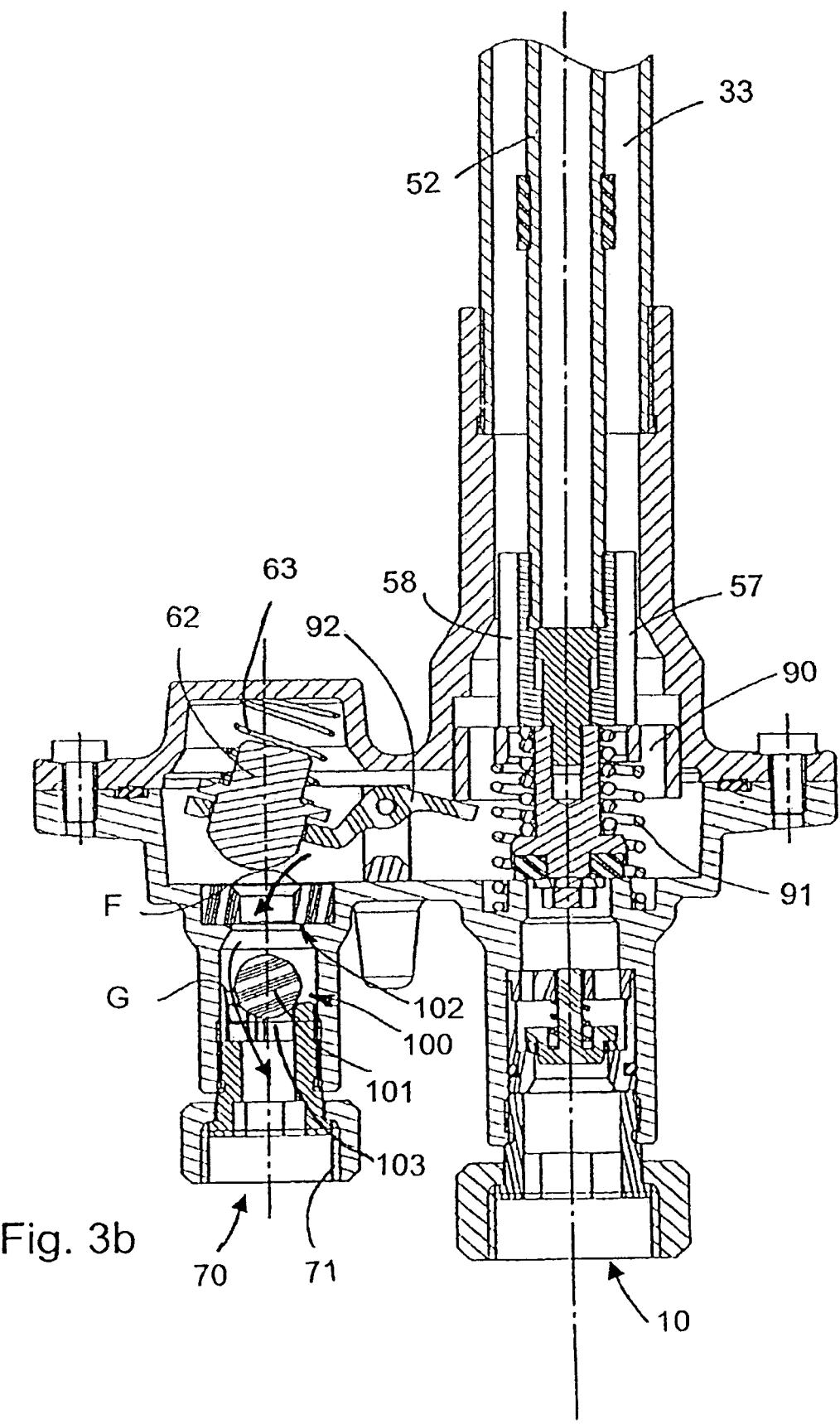
FIG. 3b shows a view corresponding to FIG. 1b in the third functional position.

FIGS. 3a and 3b show the valve arrangement according to the invention in a third functional position. In that third functional position the adaptor portion 53 has been moved still further downwardly with respect to the second functional position by means of the rotary handle 56 by way of the screwthread 54 so that the actuating rod 52 has compressed the coil spring 46. The actuating rod 52, with the intermediate sleeve 51 fixed thereto, can be moved downwardly until the intermediate sleeve 51 is axially displaced relative to the bolt 54 to such an extent that the bolt 54 butts against its upper abutment at the lower end of the actuating rod.

At the same time the intermediate sleeve 51, with a plurality of radially extending ribs 57, 58, presses against a double sleeve 90 which is hereby moved downwardly against the elastic force of a coil spring 91.

By virtue thereof, the double sleeve 90 with its outer tube element actuates a pivotal lever 92 which is connected to the valve body 62 of the second valve 60 and thereby lifts the valve body 62 off the valve body seat 61 against the force of the coil spring 63.

That opens the through flow as illustrated by the arrow F through the second valve 60 and the water in the valve arrangement can flow through the drain opening 70 past a return flow check device 100 (the flow being illustrated by the arrow G).

In addition the access of ambient air is enabled in the third functional position, by way of a bore 115. For that purpose a venting valve 110 which includes a valve body 111 and a valve body seat 112 is urged out of its closed position into the open position by means of a coil spring 113. As a result the air flows through under the actuating handle 56, whereby the access of dirt along that path is prevented, it passes into the venting passage 115, it flows through a second venting passage portion 114, it flows along the coil spring 113 through the valve 110 and it passes through the radial bores 116 in the adaptor portion 53 into the interior of the valve arrangement. That compensates for the reduced pressure caused by the discharge flow of water, in the interior of the valve arrangement.

The valve arrangement according to the invention further includes a return flow check device 100 which prevents dirty water from penetrating into the valve arrangement through the drain opening 70. For that purpose above the drain opening 70 a ball 101 which is capable of floating is arranged on a cage 103; when dirty water enters through the drain opening 70 the ball 101 floats up and is pressed against a valve seat 102.

That configuration prevents the valve arrangement from being impeded in its function by dirty water.

The drain opening 70 also has a connecting screwthread 71 to which a drainage device, for example a drainage hose, can be connected in order even in for example loamy soils to ensure that the water can reliably seep away out of the valve arrangement in the third functional position into the ground around the valve arrangement.

Referring to FIGS. 6 to 9, the second embodiment of the valve arrangement according to the invention also has an upper portion 1001 and a lower portion 1002. A delivery opening 1020 and an actuating device 1050 as well as a connecting passage 1030 are arranged in the upper valve arrangement portion 1001 and a feed opening 1010, a first valve 1040, a second valve 1060 and a drain opening 1070 as well as further portions of the connecting passage 1030 are disposed in the lower valve arrangement portion 1002.

Figure 6A:
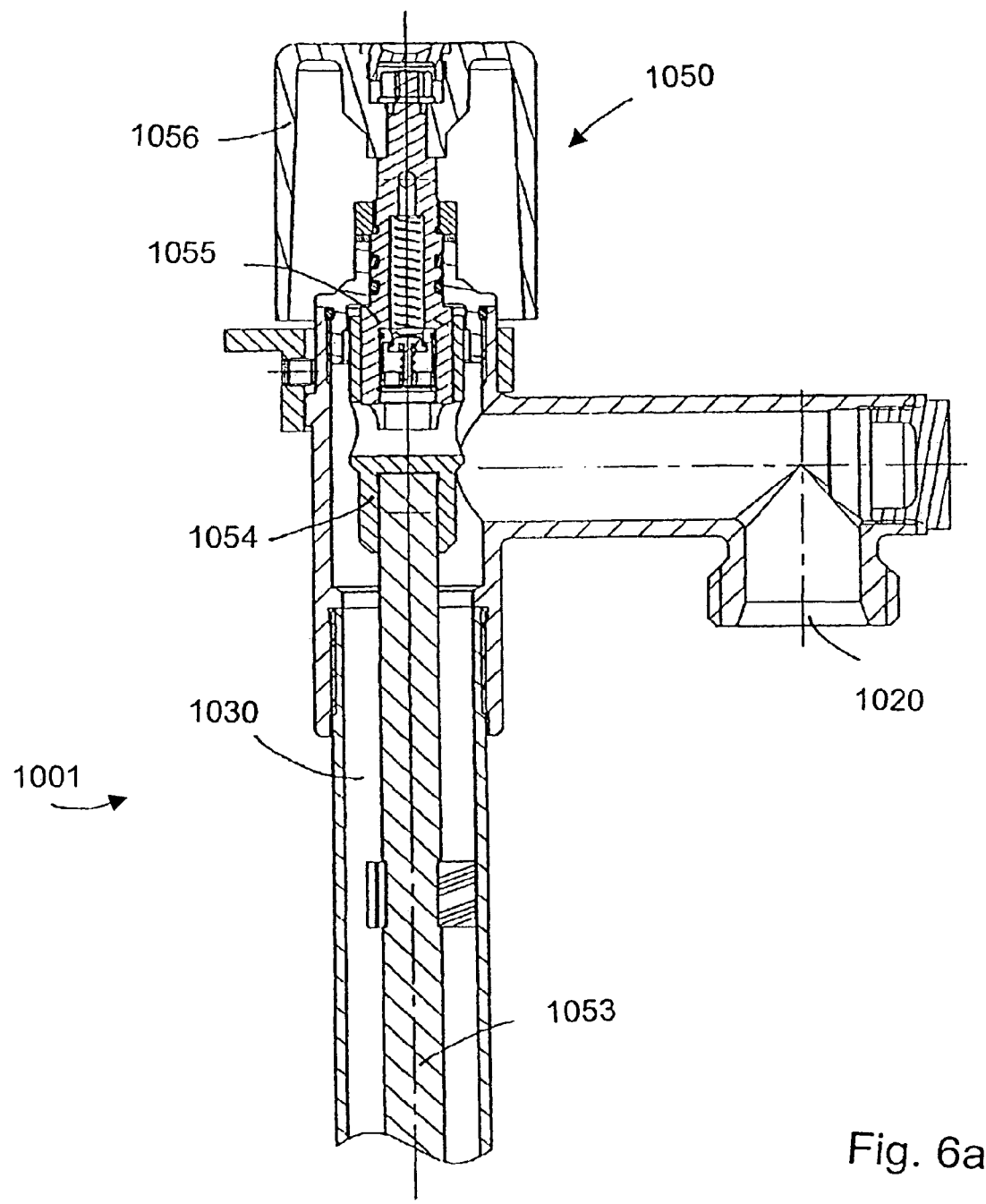
FIG. 6a shows a side view in longitudinal section of the upper part of a second embodiment of the valve arrangement according to the invention in a first functional position.
Figure 6B:
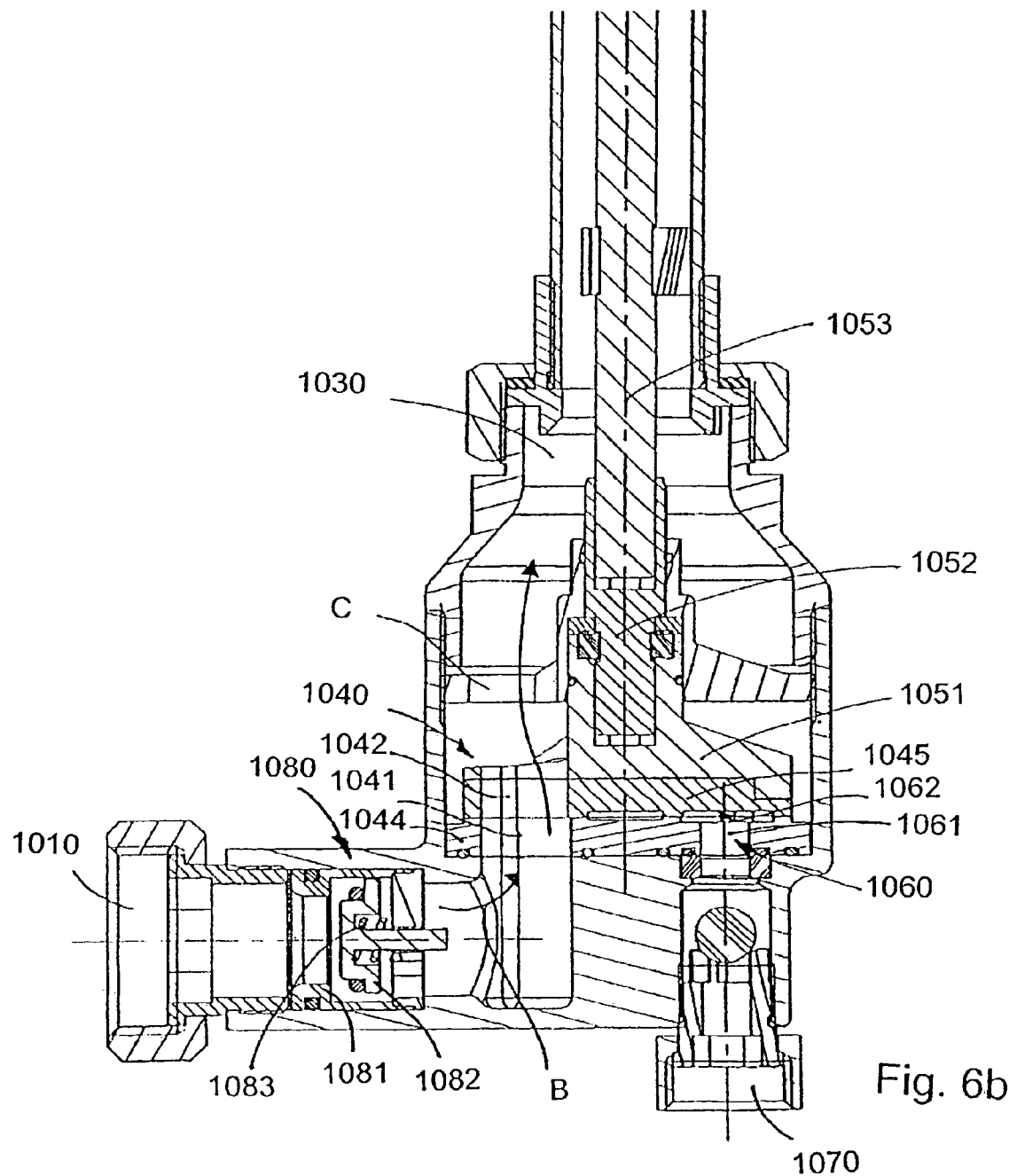
FIG. 6b shows a side view in longitudinal section of the lower part of the second embodiment of the valve arrangement according to the invention in the first functional position.
Figure 6C:
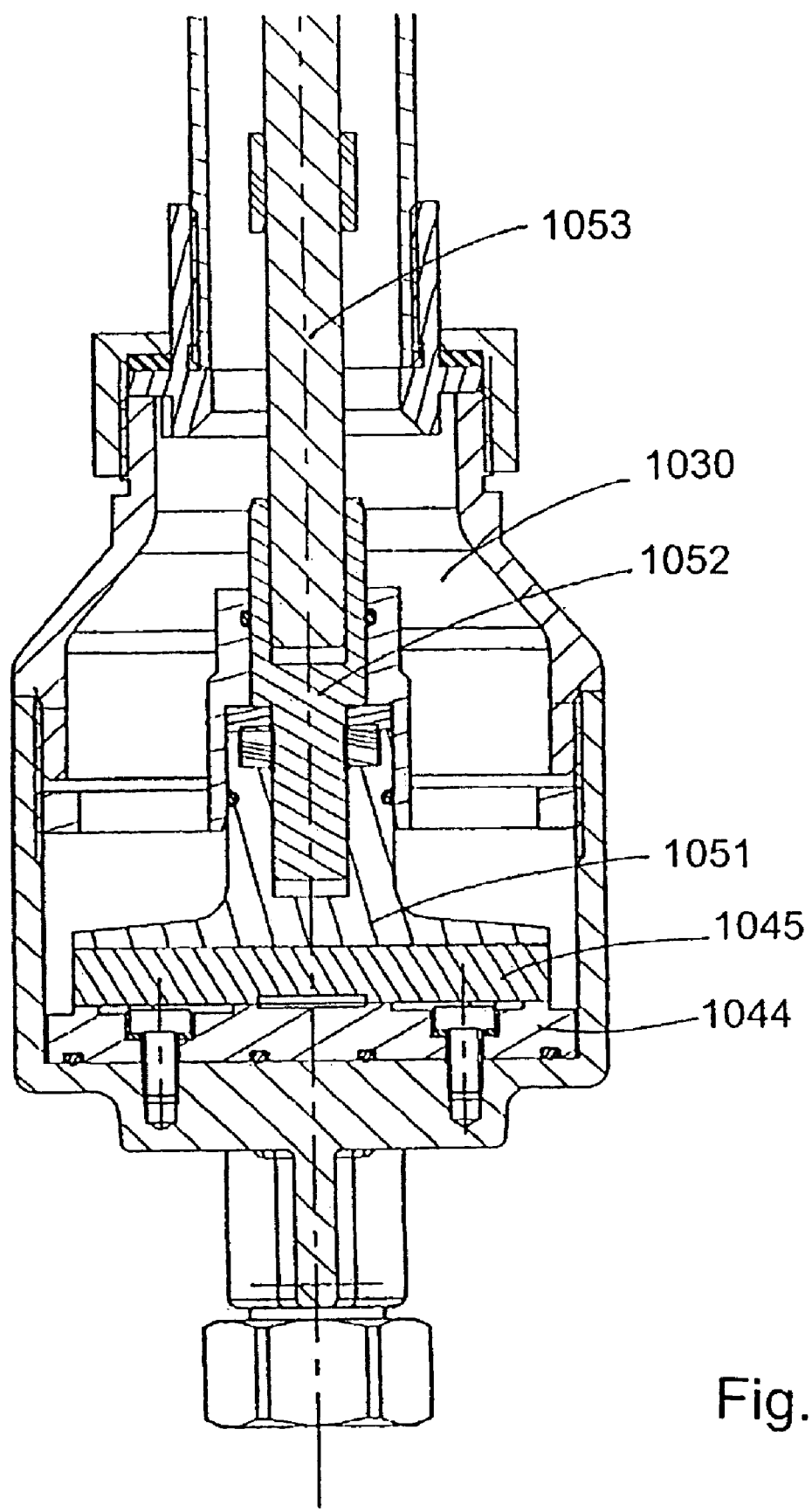
FIG. 6c shows a rear view in longitudinal section of the lower part of the second embodiment of the valve arrangement according to the invention in the first functional position.

FIGS. 6a to 6c show the second embodiment in a first functional position in which water can flow from the feed opening through the connecting passage 1030 and can be discharged from the delivery opening 1020.

For that purpose the water flows through the feed opening 1010 in a horizontal direction into the valve arrangement. It then passes a check valve 1080 which is arranged downstream of the feed opening. The check valve 1080 is of the same design configuration as the check valve 80 of the first embodiment and accordingly includes a valve seat 1081, a valve body 1082 and a coil spring 1083. The water then further flows in the direction of the first valve 1040, as identified by the arrow B.

The first valve 1040 is formed by an opening 1041 which is disposed eccentrically with respect to the centre line of a ceramic valve disc 1044 and which co-operates with an eccentric opening 1042 in a second rotatable and also ceramic valve disc 1045. The two eccentric openings 1041, 1042 are so arranged relative to each other in the first functional position that the water can flow through the two openings and can thus pass vertically into the connecting passage 1030, as identified by arrow C.

The third, rotatably supported second valve disc 1045 is connected fixedly for the transmission of a turning moment to an actuating ring 1051 which in turn is connected fixedly for the transmission of a turning moment to a coupling 1052. The coupling 1052 is connected fixedly for the transmission of a turning moment to an actuating rod 1053 which is in the form of a hexagonal rod and which extends from the lower valve arrangement portion 1002 into the upper valve arrangement portion 1001.

As can be particularly clearly seen from FIG. 6a the actuating rod 1053 is connected fixedly for the transmission of a turning moment at the upper end to a screw-in portion 1054 which in turn is connected fixedly for the transmission of a turning moment to a spindle 1055.

The spindle 1055 is connected fixedly for the transmission of a turning moment to a handle 1056 which in the illustrated embodiment is in the form of a cylindrical hollow cap with a pivotal handle formed thereon.

As can be clearly seen from FIG. 6b and FIG. 6c, the second movable valve disc 1045 does not have any through-flow opening other than the through-flow opening 1042 so that only a flow through the opening 1041, 1042 is possible for the water in the first functional position. As can also be clearly seen from FIG. 6c the first stationary valve disc 1044 is fixed in the lower housing portion of a valve housing by means of hexagonal socket screws.

A second valve 1060 is formed by a second eccentric opening 1061 in the first valve disc 1044 and the eccentric opening 1042 in the first rotatable valve disc 1045. The first valve 1040 and the second valve 1060 are thus integrated into the two valve discs 1044, 1045. The second eccentric opening 1061 is disposed displaced through 180° relative to the first opening 1041 in the first valve disc 1044. In the first functional position the second eccentric opening 1061 is closed by a corresponding sealing surface portion 1062 of the second movable valve disc.

The openings 1041 and 1042 are of a cross-sectional configuration in the form of a piece of cake with a flattened-off tip in order to allow a maximum through-flow cross-section with a small dimension for the valve disc.

Figure 7A:
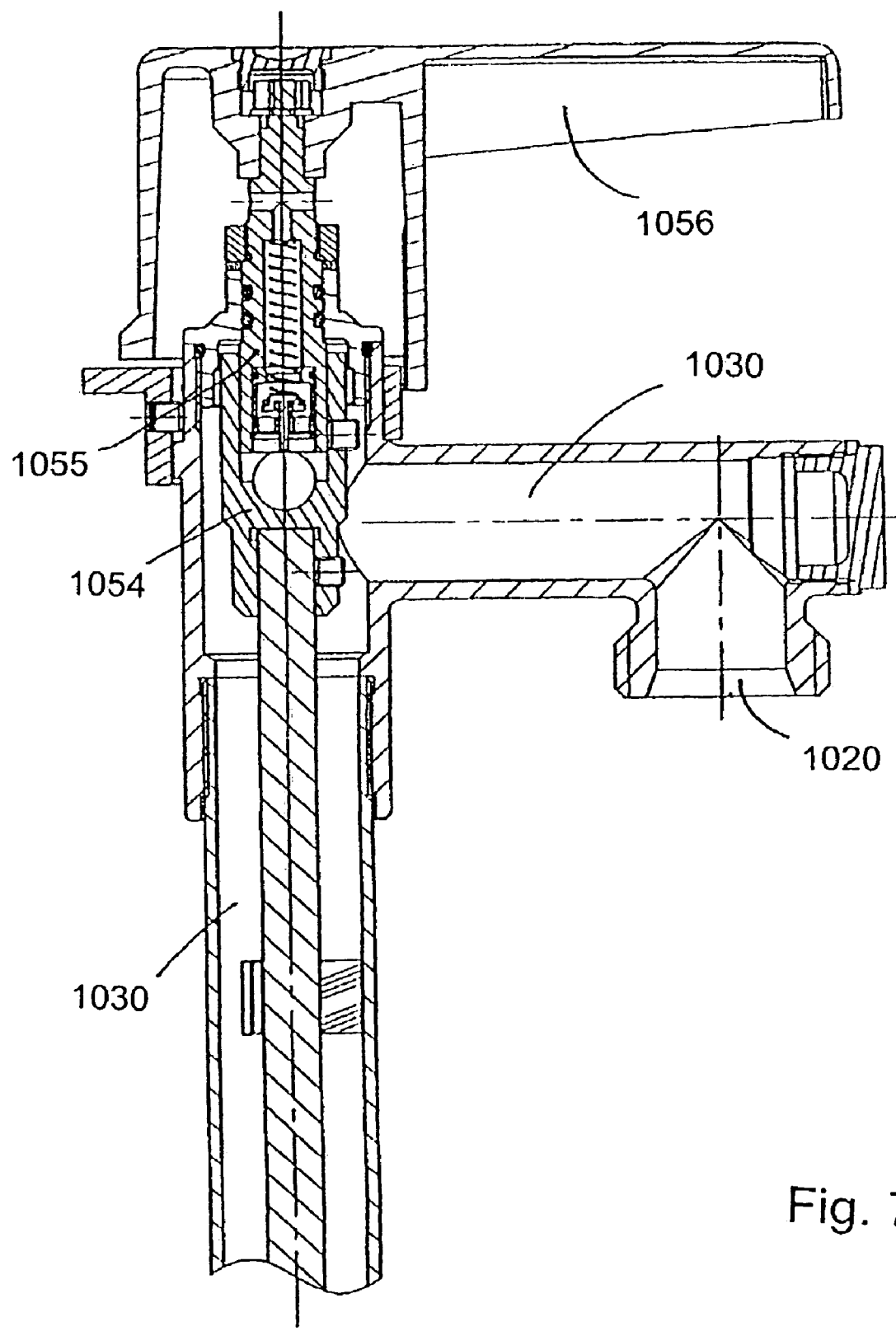
FIG. 7a shows a view corresponding to FIG. 6a in a second functional position.
Figure 7B:
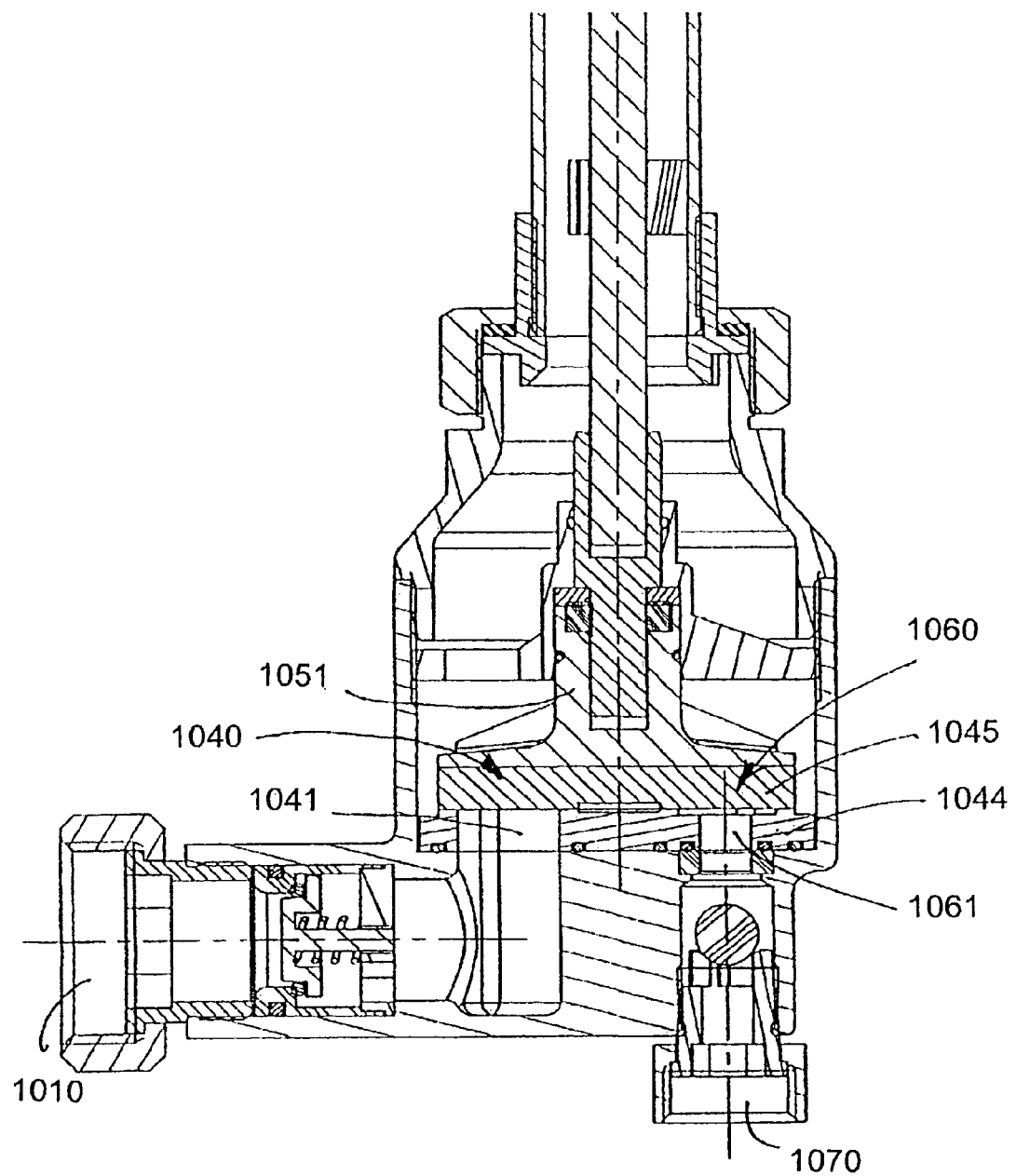
FIG. 7b shows a view corresponding to FIG. 6b in the second functional position.
Figure 7C:
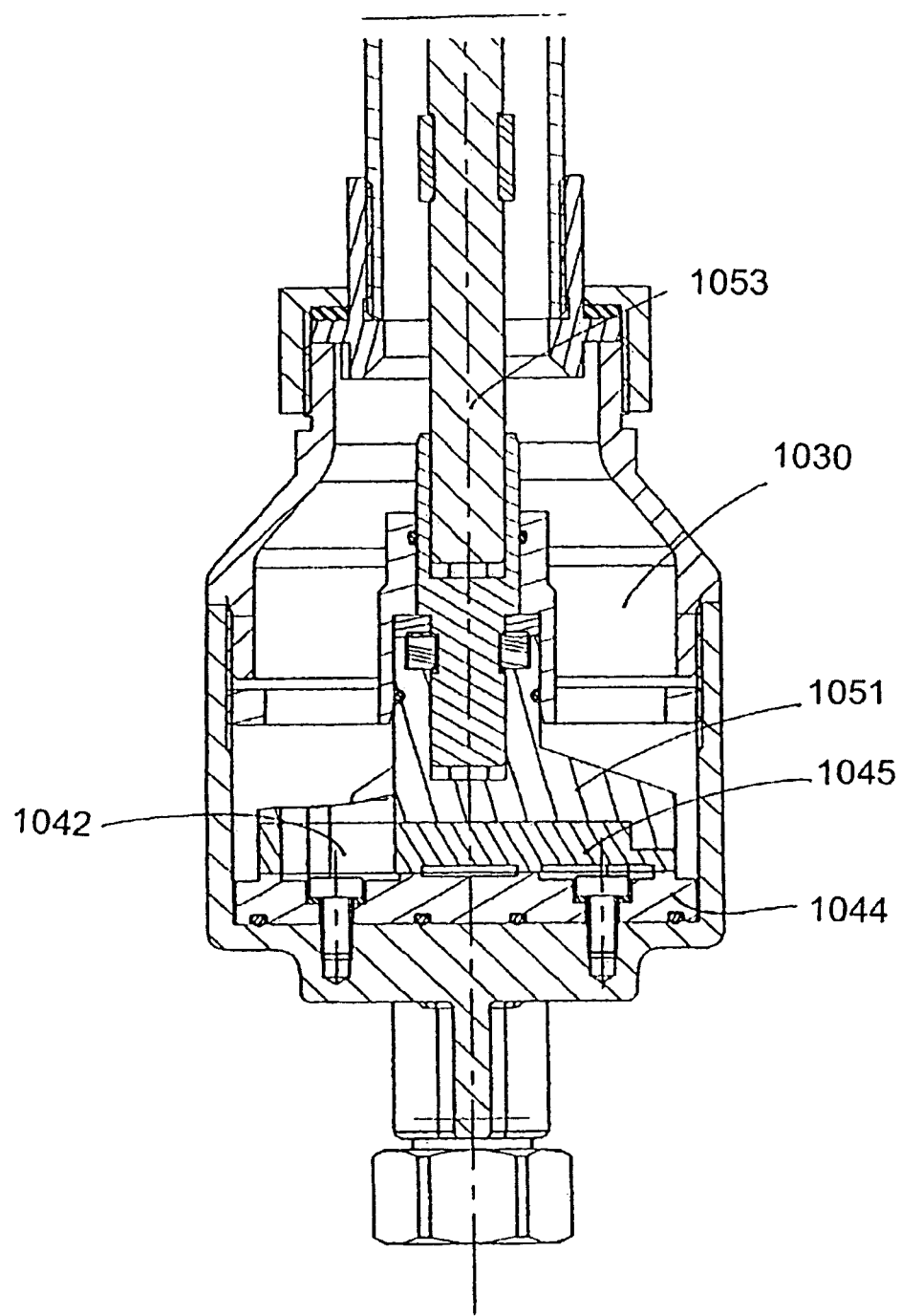
FIG. 7c shows a view corresponding to FIG. 6c in the second functional position.

FIGS. 7a to 7c show the second embodiment of the valve arrangement according to the invention in a second functional position. In that second functional position the valve handle 1056 is pivoted through 90° relative to the first functional position whereby accordingly the second rotatable valve disc 1045 is pivoted through 90° relative to the position shown in FIGS. 6a to 6c.

That pivotal movement means that the eccentric opening 1042 in the second ceramic valve disc 1045 is not in fluid communication with the first eccentric opening 1041 or with the second eccentric opening 1061 in the first valve disc 1044. In that way the water can pass neither the first valve 1040 nor the second valve 1060, that is to say, there is neither a flow of water from the feed opening 1010 to the delivery opening 1020 nor is there a discharge flow of water out of the connecting passage through the drain opening 1070.

The second functional position can be used for example when the external conditions are sufficiently warm as a closed function of the valve arrangement according to the invention. The functional position makes it possible for the discharge of water through the delivery opening to be stopped but for the water not to be removed from the connecting passage 1030, that is to say the valve arrangement is not emptied of water. On the one hand, that prevents a user from being caused to assume that there is a leak due to residual water dripping out of the delivery opening, while on the other hand for the next opening process that prevents the entire connecting passage having to be filled with water as it was not drained of water. In addition, that 'Summer' position makes it possible to save on water which otherwise, if drainage of water from the valve arrangement took place, would seep out of the connecting passage into the surrounding soil in each closing process.

As can be clearly seen from FIG. 7c the eccentric opening 1042 in the second movable valve disc 1045, in the second functional position, is disposed opposite a closed portion of the first valve disc so that no water can pass through that opening.

Figure 8A:
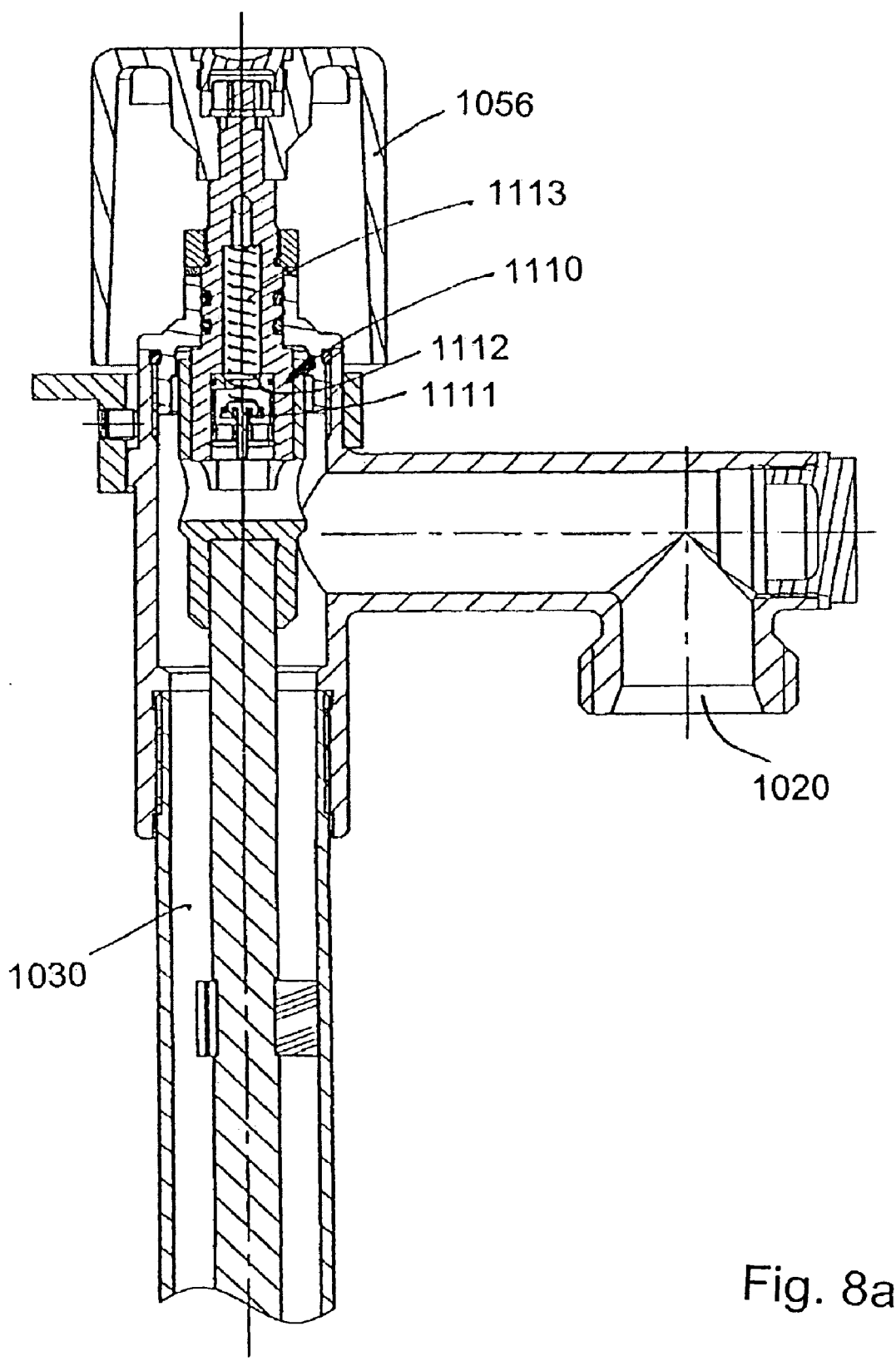
FIG. 8a shows a view corresponding to FIG. 6a in the third functional position.
Figure 8B:
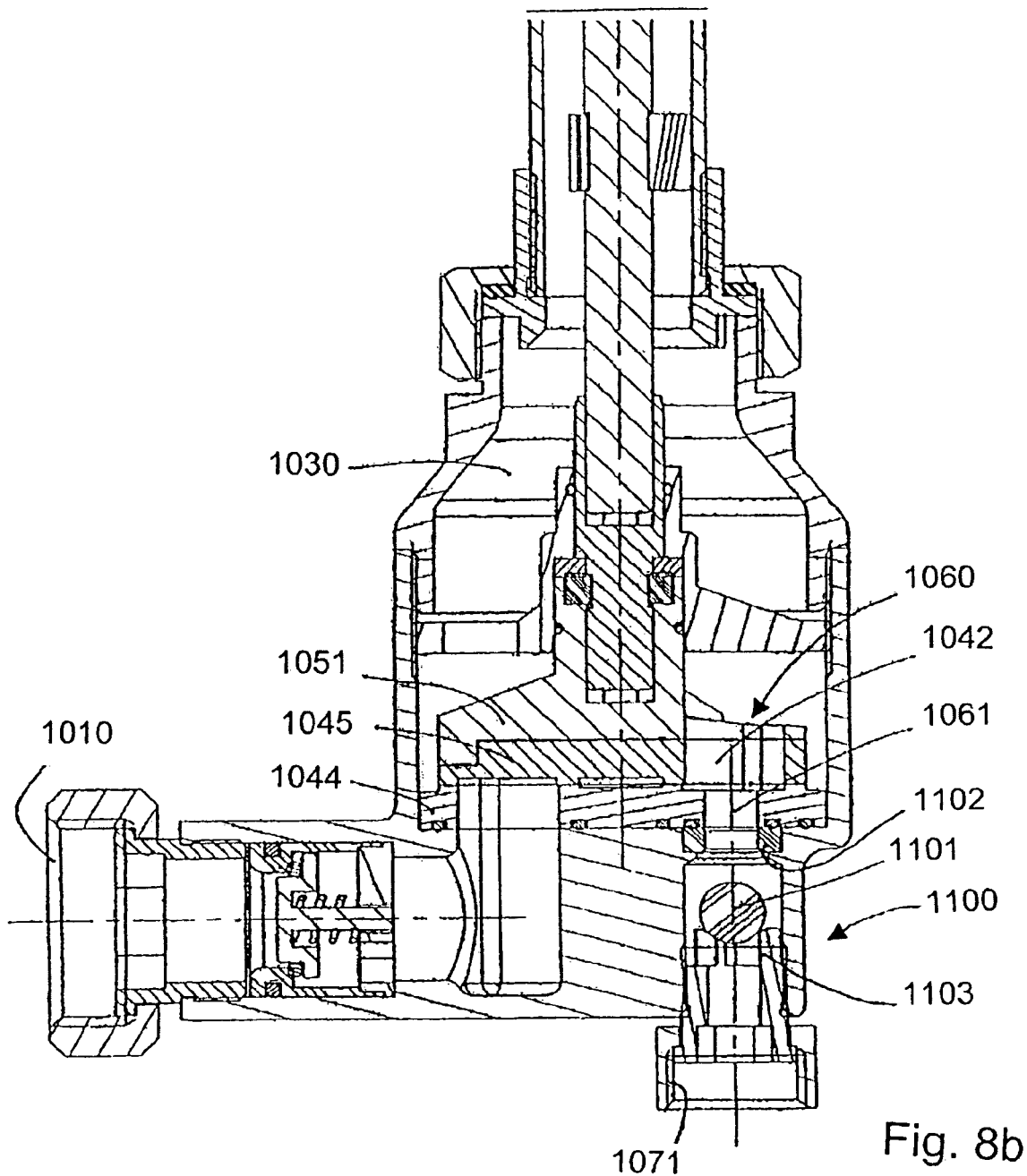
FIG. 8b shows a view corresponding to FIG. 6b in the third functional position.
Figure 8C:
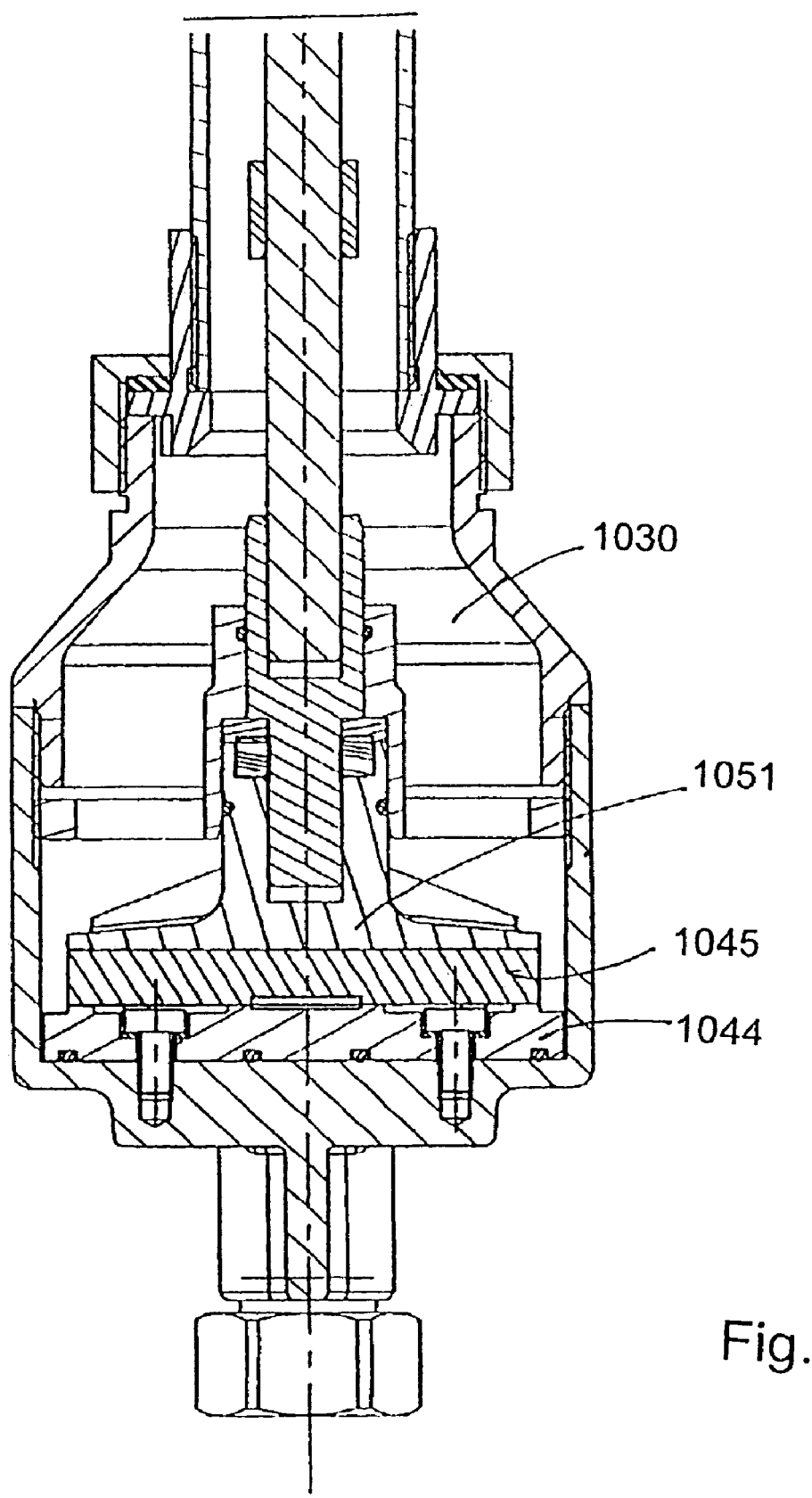
FIG. 8c shows a view corresponding to FIG. 6c in the third functional position.
Figure 9:
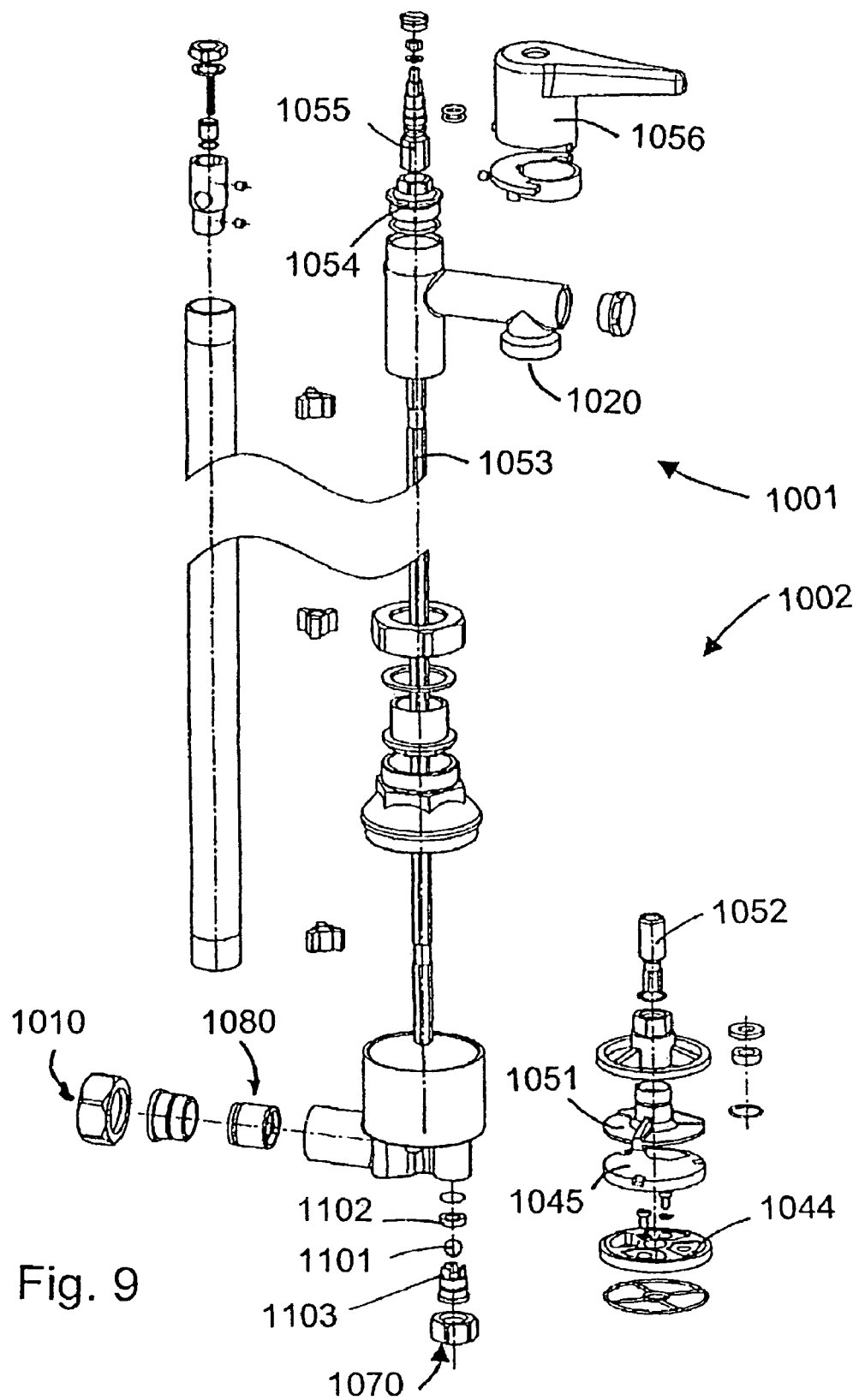
FIG. 9 shows a perspective exploded view of the second embodiment of the valve arrangement according to the invention in a side view inclinedly from above and from the front.

FIGS. 8a to 8c show the second embodiment of the valve arrangement according to the invention in a third functional position. In that third functional position the second rotatable valve disc is pivoted through 90° relative to the second functional position and through 180° relative to the first functional position. The third functional position serves to close off the through flow of water from the feed opening 1010 to the delivery opening 1020 and to remove the water from the valve arrangement, that is to say to vent it. In that way the water disposed in the valve arrangement is removed and that therefore permits frost-resistant operation. The third functional position can therefore be referred to as the 'Winter' closed position.

As can be clearly seen from FIG. 8b in the third functional position the eccentric opening 1042 of the second rotatable valve disc 1045 is in fluid communication with the second eccentric opening 1061 of the first valve disc 1044. The second valve 1060 is opened in that way.

The second eccentric opening 1061 is in fluid communication with a return flow check device 1100. The return flow check device 1100 is of the same design configuration as the return flow check device 100 of the first embodiment and consequently includes a floatable ball 1101 which is arranged above the drain opening 1070 and which is disposed on a cage 1103 and which floats up when dirty water enters through the drain opening 1070 and is pressed against a valve seat 1102.

In the third functional position the water in the connecting passage 1030 can flow through the valve openings 1042, 1061 of the second valve to the return flow check device 1100, pass same through the cage 1103 and issue from the drain opening 1070. Just as in the first embodiment, a drainage device such as for example a drainage hose can be connected to the drain opening 1070 by means of a connecting screwthread 1071.

Just as in the first embodiment, disposed in the actuating handle of the second embodiment is a venting valve 1110 which is of the same design configuration as the venting valve 110 of the first embodiment. The venting valve 1110 of the second embodiment accordingly comprises a valve body 1111 and a valve body seat 1112 which is urged out of its closed position into the open position by means of a coil spring 1113, whereby the air can flow out of the ambient atmosphere through beneath the actuating handle 1056 into the interior of the valve arrangement and thus permits the removal of water from or venting of the valve arrangement. In the first functional position the venting valve 1110 is moved into the closed position by the increased pressure of water in the interior of the valve arrangement, which presses against a valve plate 1117, whereby no water can issue through the venting valve 1110 in the first functional position.

Figure 10:
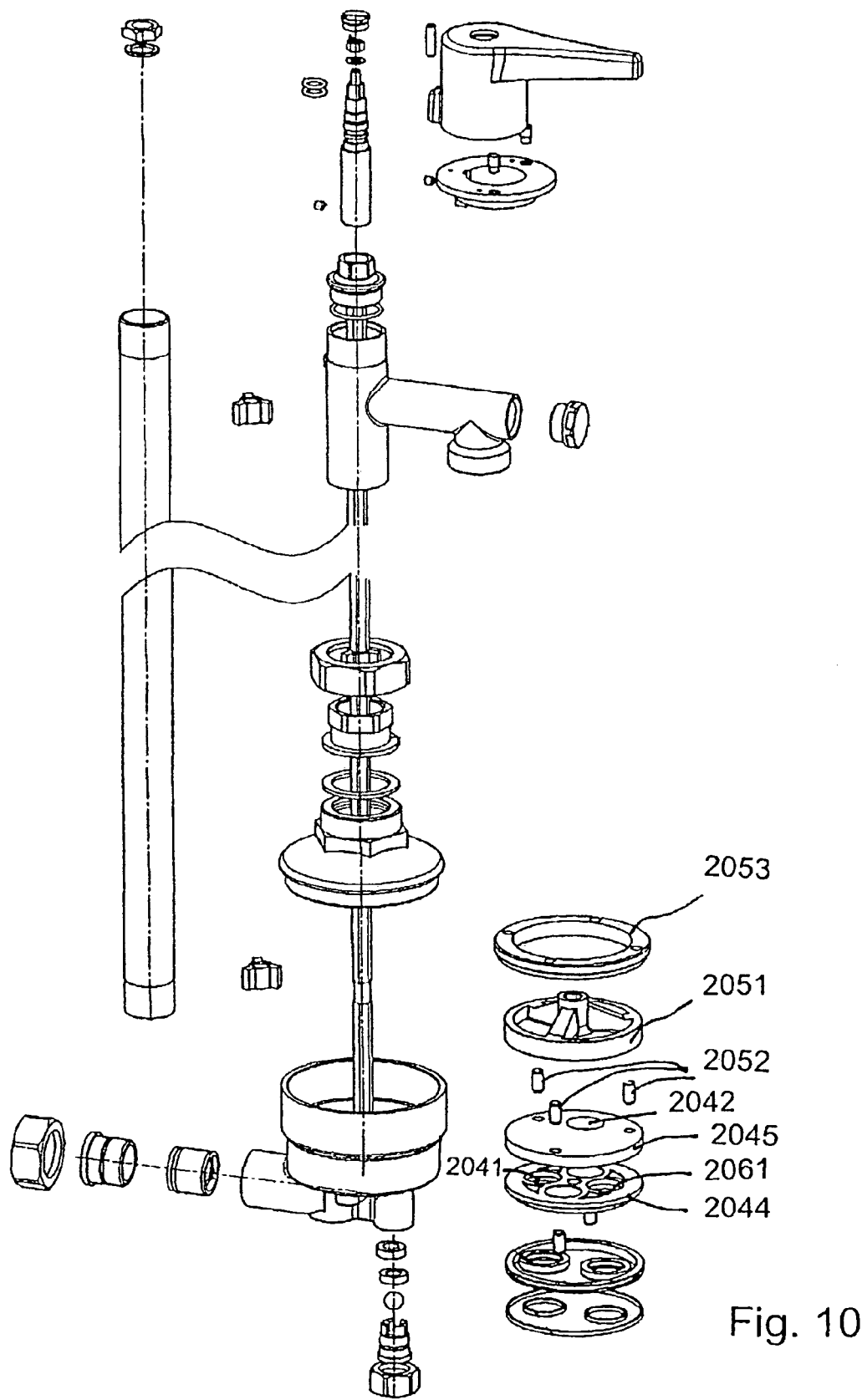
FIG. 10 shows a perspective exploded view of a third embodiment of the valve arrangement according to the invention in a side view inclinedly from above and from the front.

Referring now to FIG. 10 a third embodiment of the valve arrangement according to the invention will be described. The valve arrangement shown in FIG. 10 and the following FIGS. 11a-13c is similar in a number of aspects to the above-described second embodiment and a detailed description of the similar parts is omitted herein.

A first important difference between the second and third embodiment of the invention is that the third embodiment does neither comprise a third valve for venting the inner part of the valve arrangement nor a separate venting opening. The advantage of this is that the number of parts can be reduced and potential unwanted drainage of water through the separate vent opening can be avoided. In use, the air ventilating the inner interior of the valve arrangement can flow through the discharge opening of the valve arrangement in the third functional position.

Further, the third embodiment comprises a first moveable valve disc 2044 having a first eccentric opening 2041 and a second eccentric opening 2061 which are of circular shape and correspond with a respective circular opening 2042 in a second rotatable valve disc 2045. Whereas the form of a piece of a cake of the openings in the first and second valve disc 1044, 1045 of the second embodiment provides a proportional increase of water flow with respect to an angular movement of the actuation handle, it is preferable in certain applications to have circular openings in order to ease the sealing of the openings in the valve discs against the interior of the housing in that it is possible to use annular gaskets for this purpose.

An important functional difference of the third embodiment is that the second valve disc 2045 abuts against a coupling element 2051 and is coupled to this coupling element 2051 via three pins 2052 to transmit a torque between the coupling element 2051 and the second valve disc 2045. The coupling element 2051 and the second valve disc 2045 are axially slidable within the housing but abut against an annular abutment 2053 having an external thread which is screwed into a corresponding internal thread in the housing.

Further, the valve disc 2044 is axially slidable within the housing but axially abuts against the second valve disc 2045.

The water flowing through the feed opening in the first functional position first passes the first functional disc 2044 through the opening 2041 and afterwards passes the second valve disc through the opening 2042 and flows through the connecting passage to the delivery opening as in the previous embodiments.

In the second and third functional position, the first valve disc 2044 of the third embodiment is pressed onto the second valve disc 2045 by the water pressure at the feed opening. By this, the sealing between the two valve discs is enhanced thus effecting a self-reinforcing sealing function. The third embodiment is thus capable to provide a safe sealing of the valve arrangement in all three functional positions and at the same time an easy handling of the actuation handle when switching between the three functional positions.

Figure 11A:
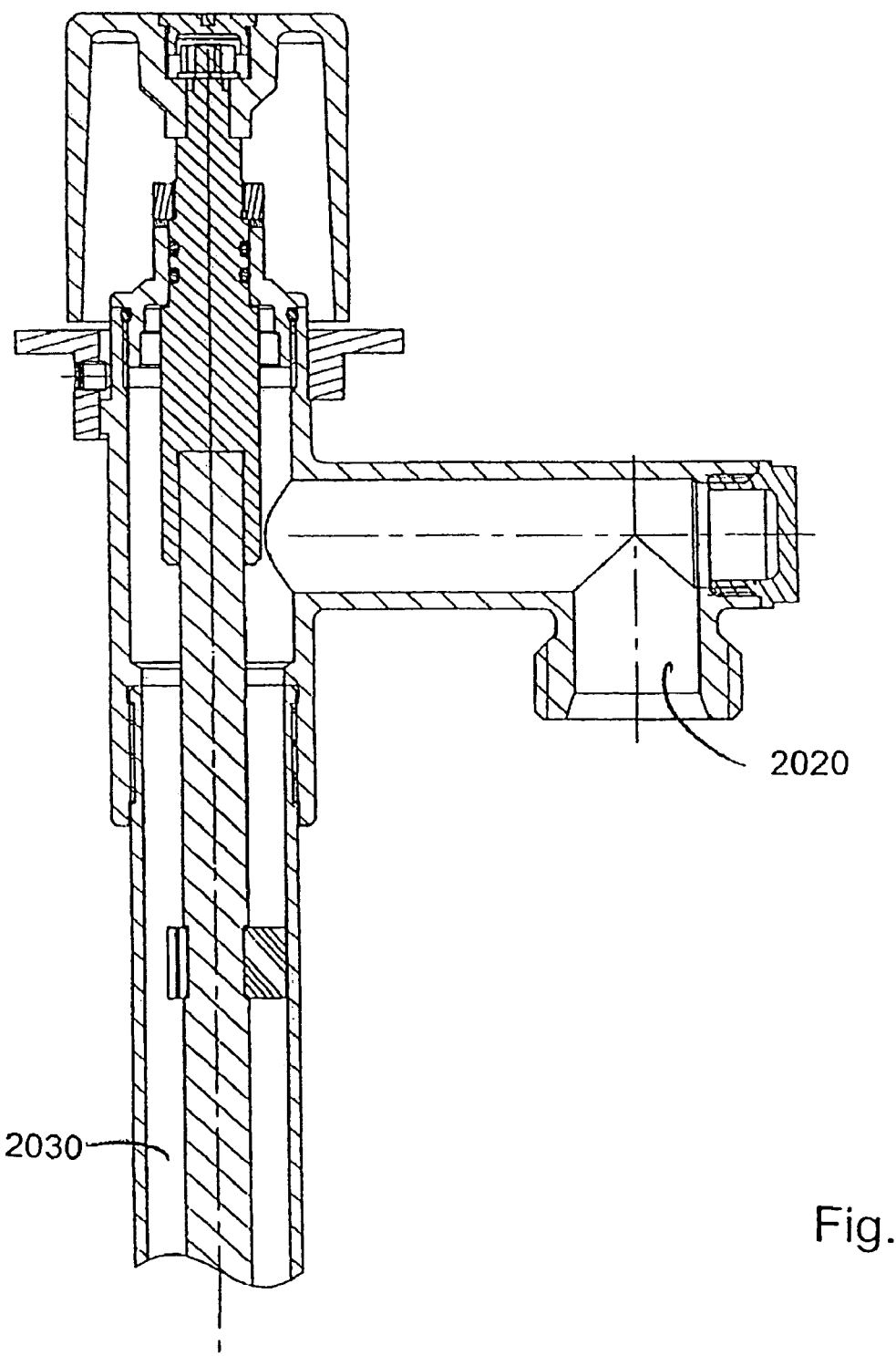
FIG. 11a shows a side view in longitudinal section of the upper part of the third embodiment in a first functional position.
Figure 11B:
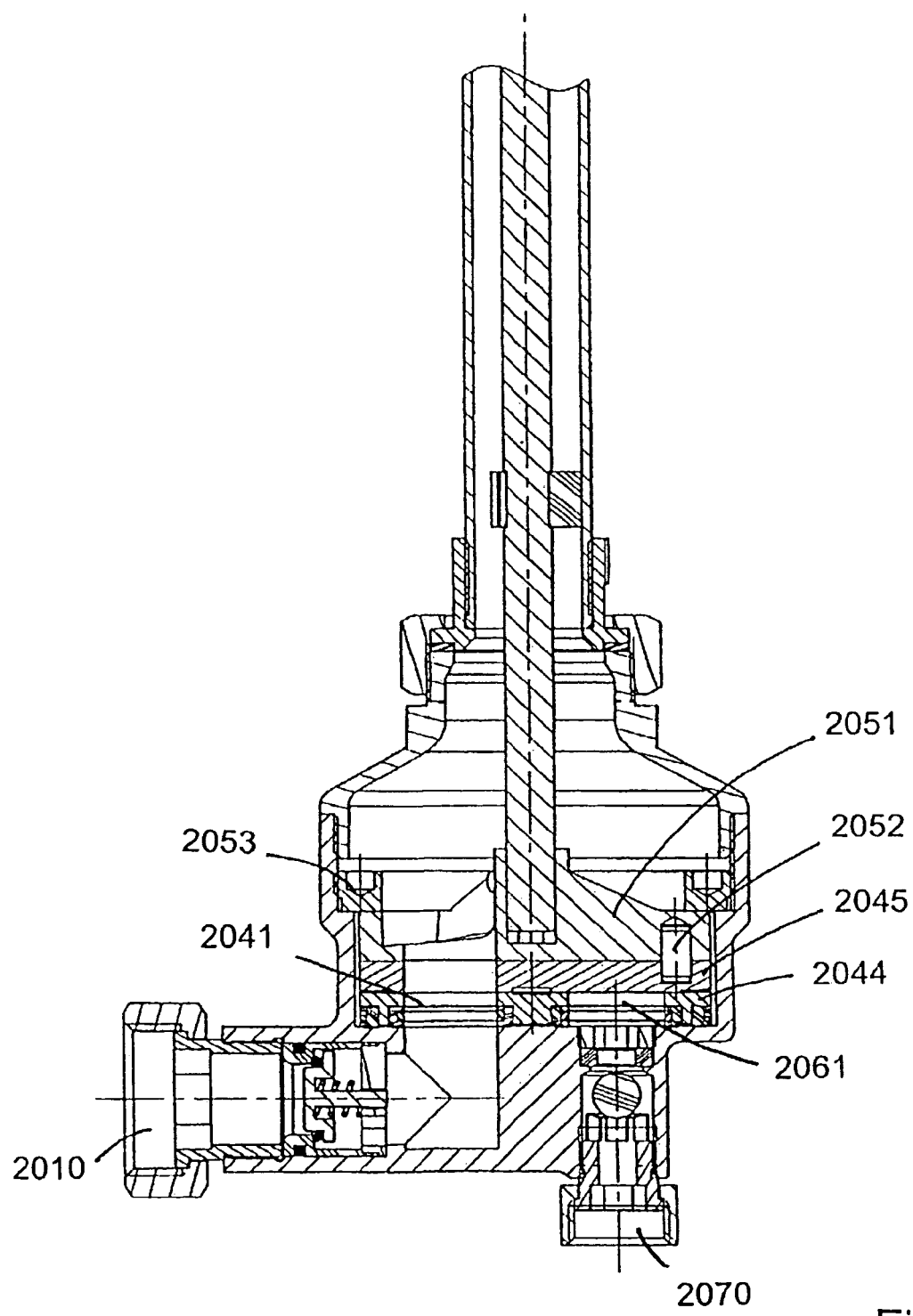
FIG. 11b shows a side view in longitudinal section of the lower part of the third embodiment in the first functional position.
Figure 11C:
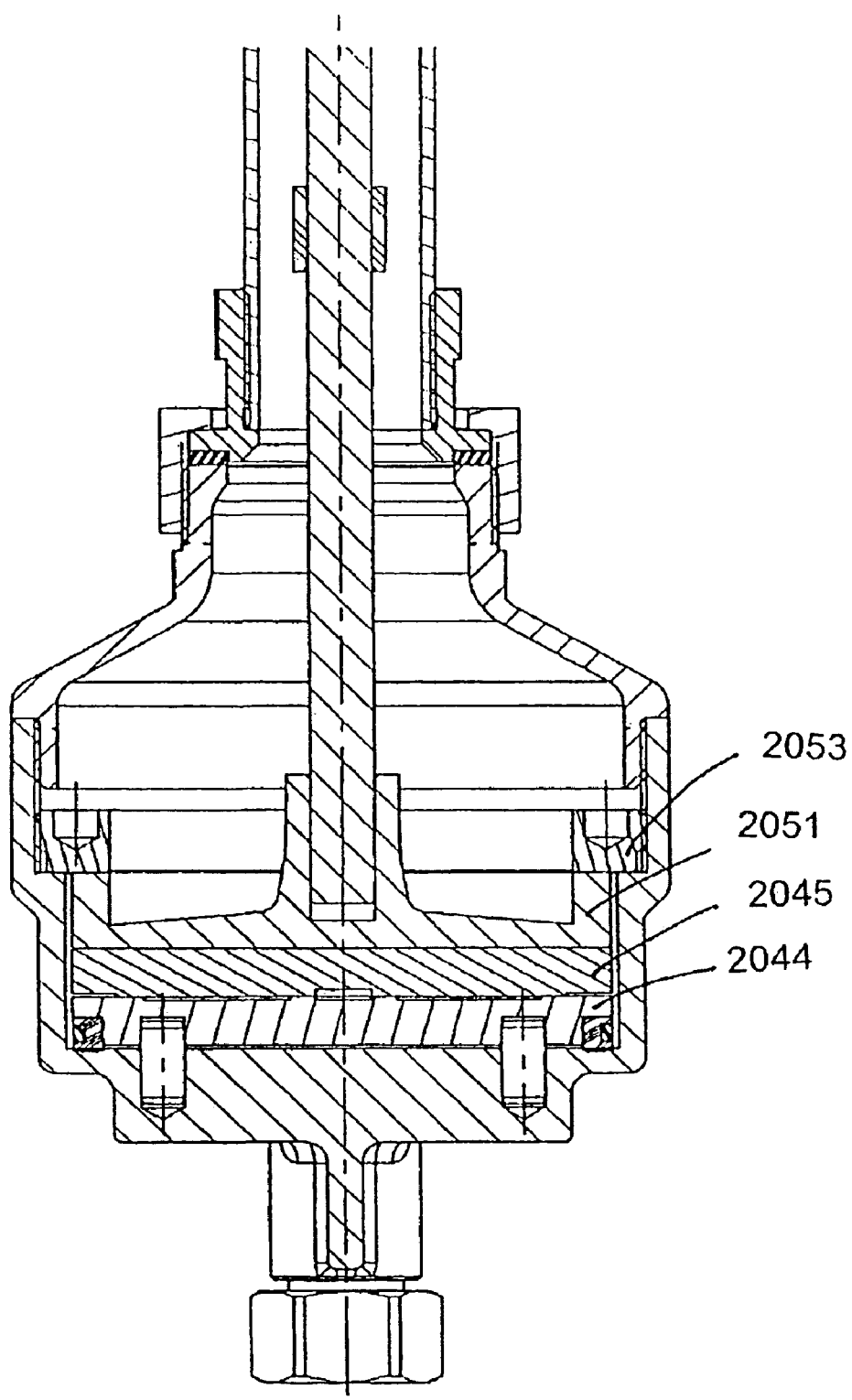
FIG. 11c shows a rear view in longitudinal section of the lower part of the third embodiment in the first functional position.

FIGS. 11*a-c* depict the third embodiment in the first functional position, which corresponds to the "open" position, wherein water can flow from the feed opening though the connecting passage 2030 and can be discharged from the delivery opening 2020.

Figure 12A:
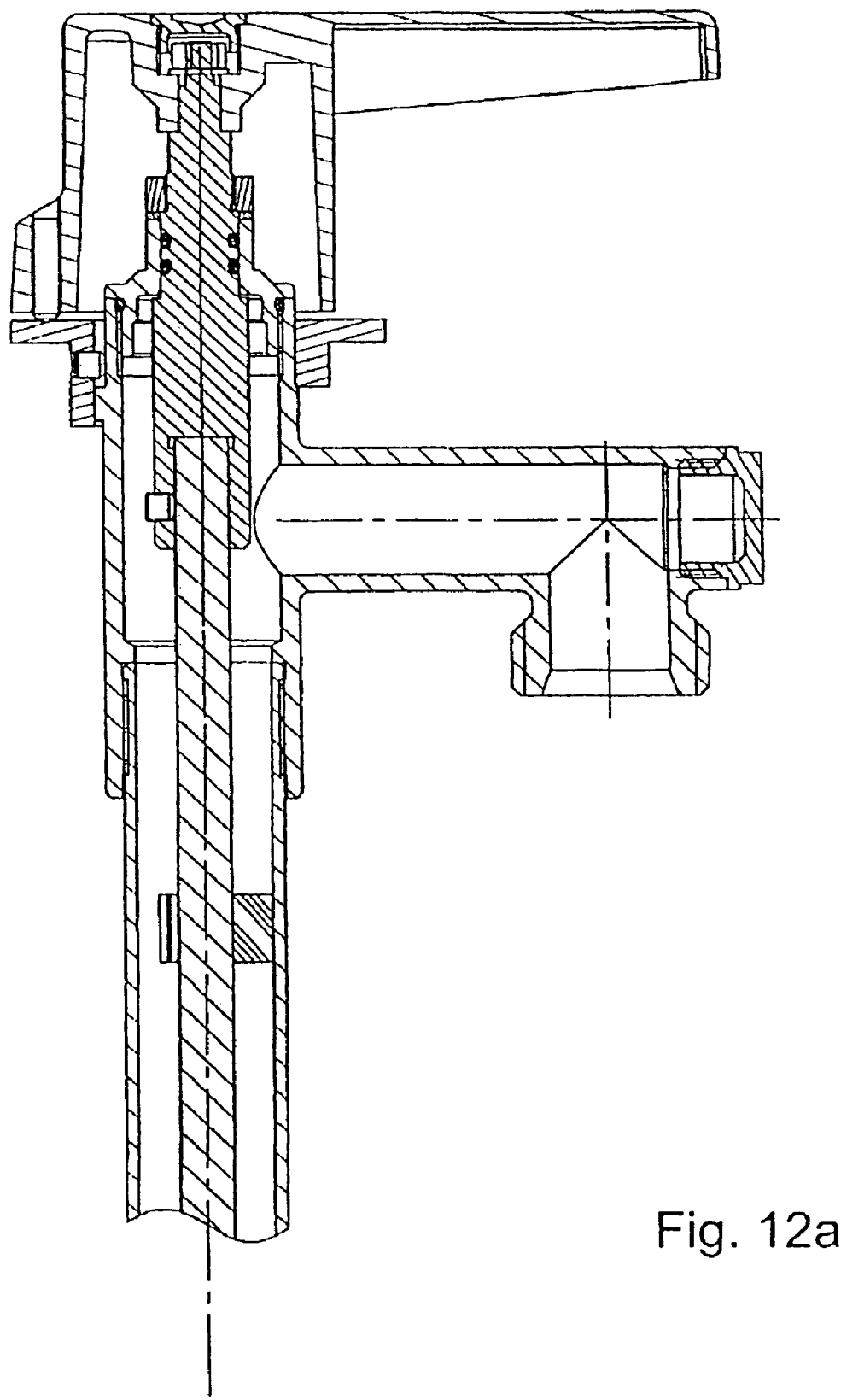
FIG. 12a shows a view corresponding to FIG. 11a in a second functional position.
Figure 12B:
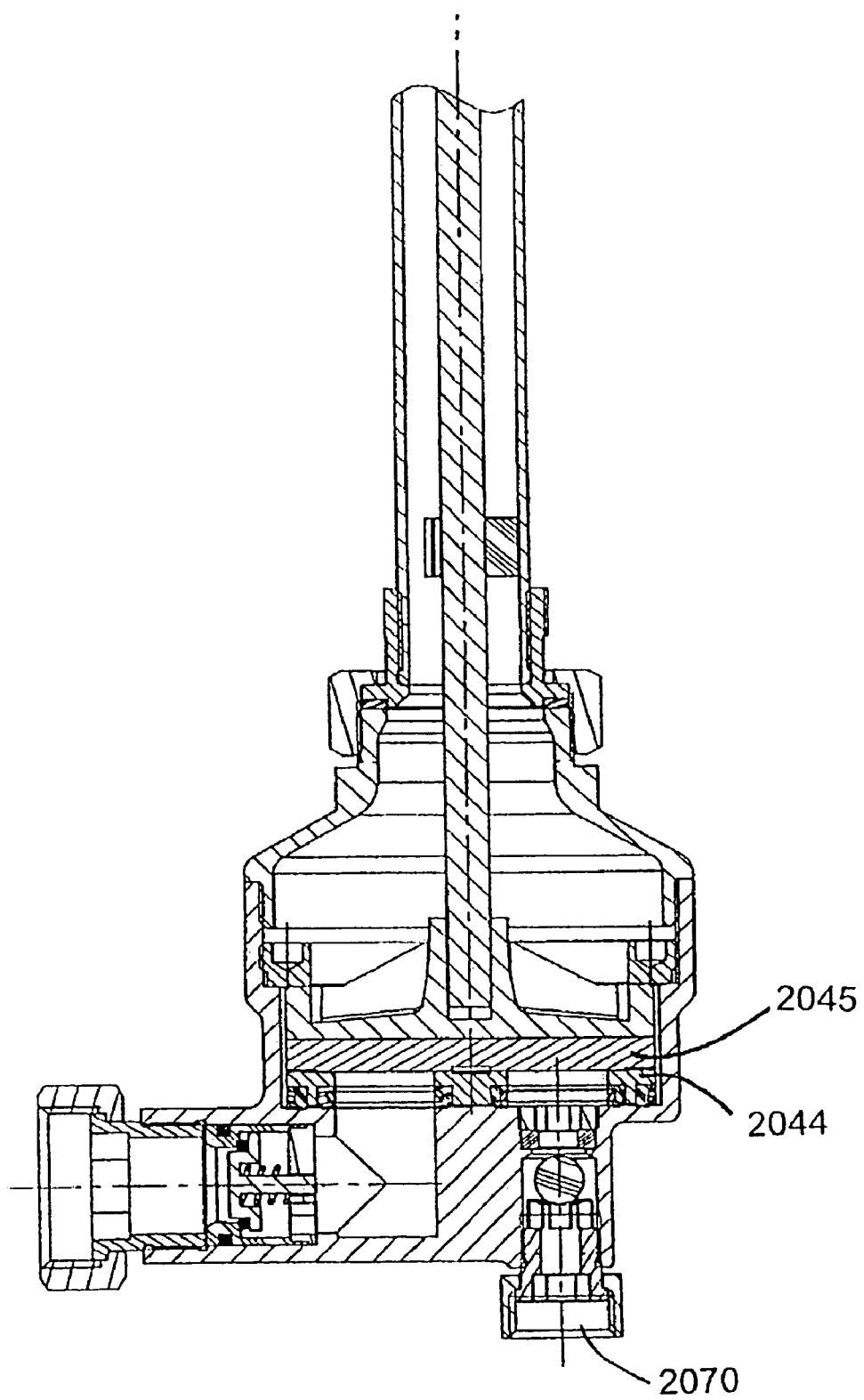
FIG. 12b shows a view corresponding to FIG. 11b in the second functional position.
Figure 12C:
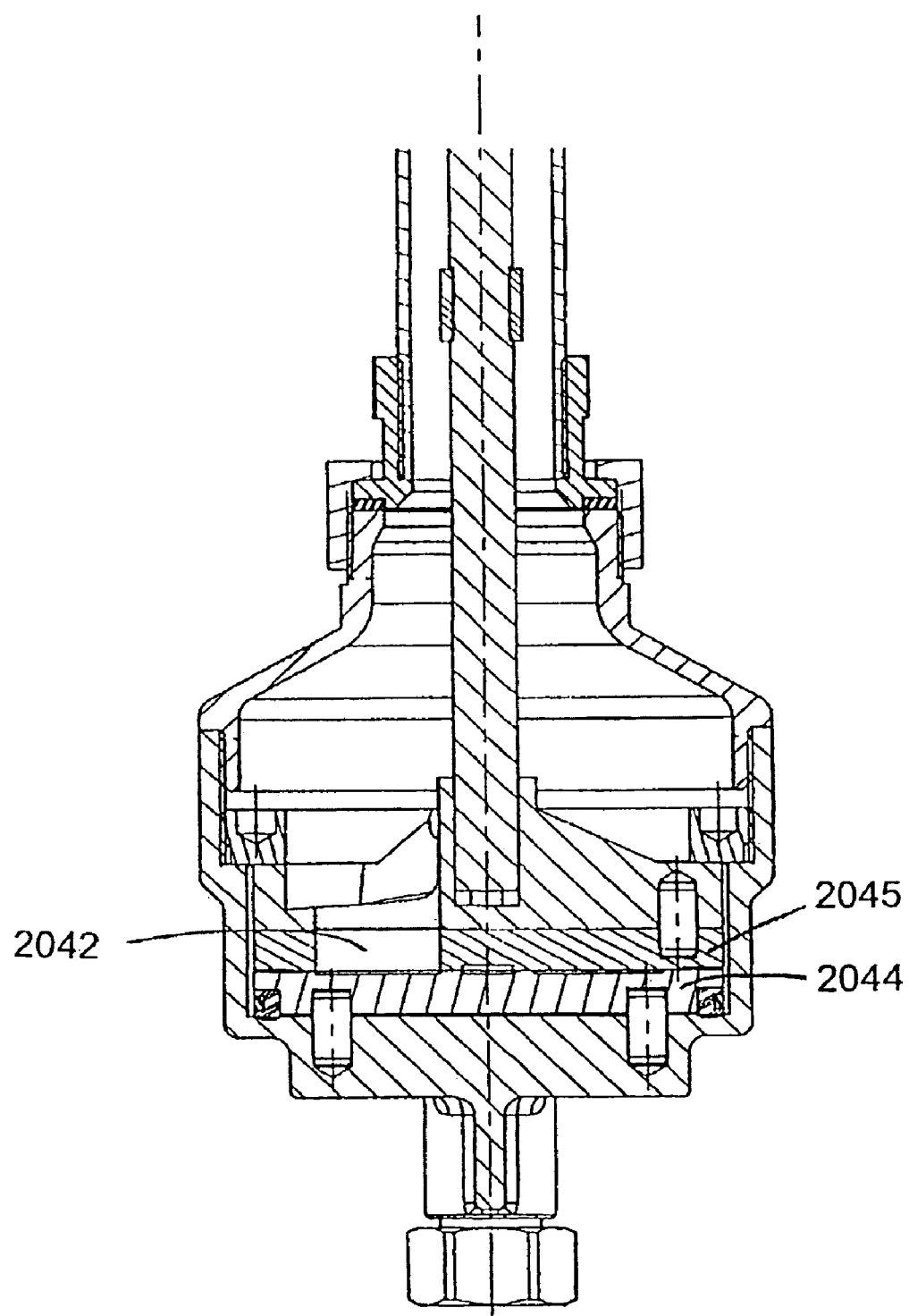
FIG. 12c shows a view corresponding to FIG. 11c in the second functional position.

FIGS. 12*a-c* depict the third embodiment in the second functional position which corresponds to the "summer-closed" position. In this position, the first and second valve is closed thereby interrupting the flow of water through the feed opening, the connecting passage and the delivery opening and further keeping the water within the valve arrangement, i.e. not allowing the drainage of the system.

Figure 13A:
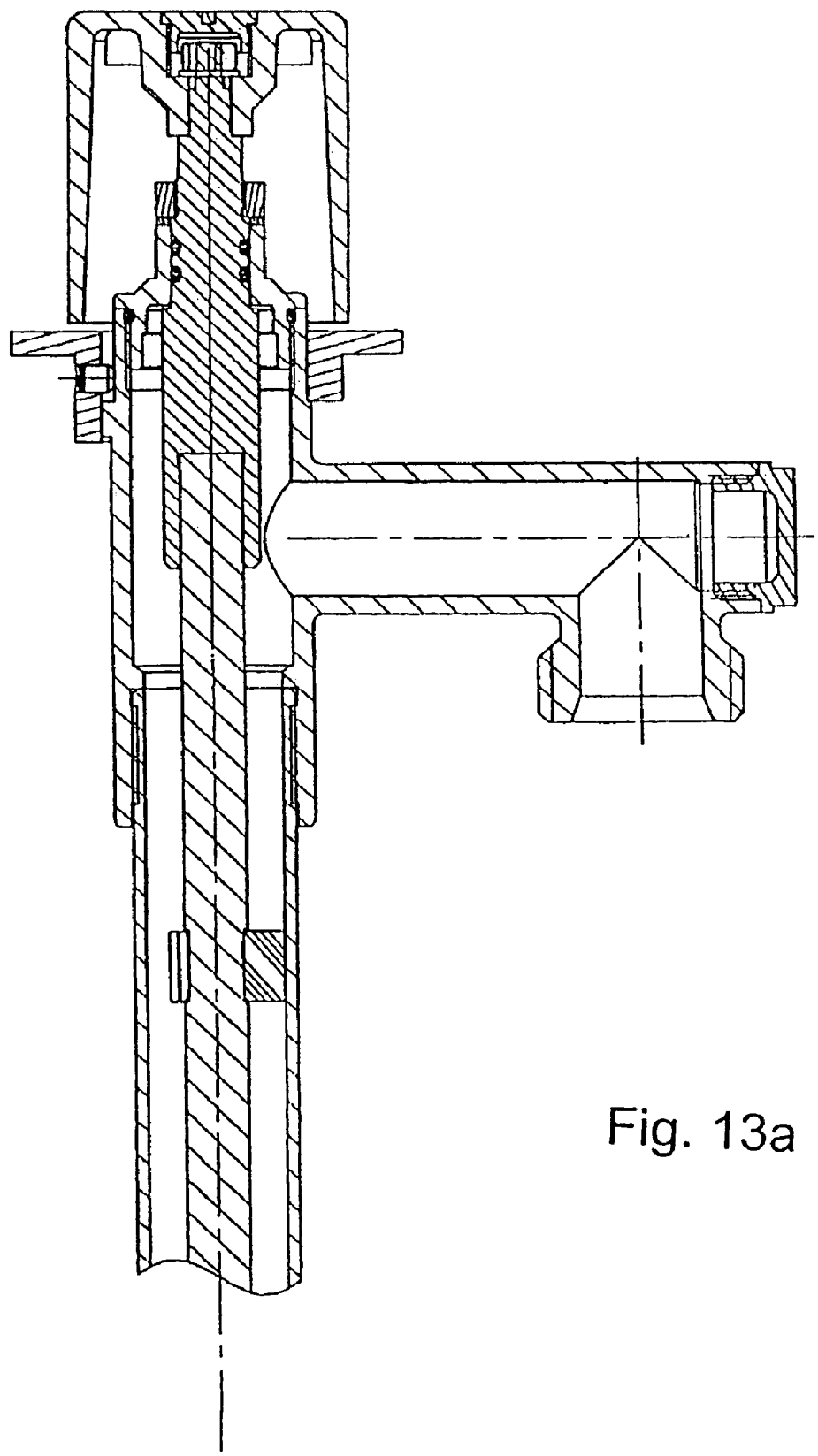
FIG. 13a shows a view corresponding to FIG. 11a in the third functional position.
Figure 13B:
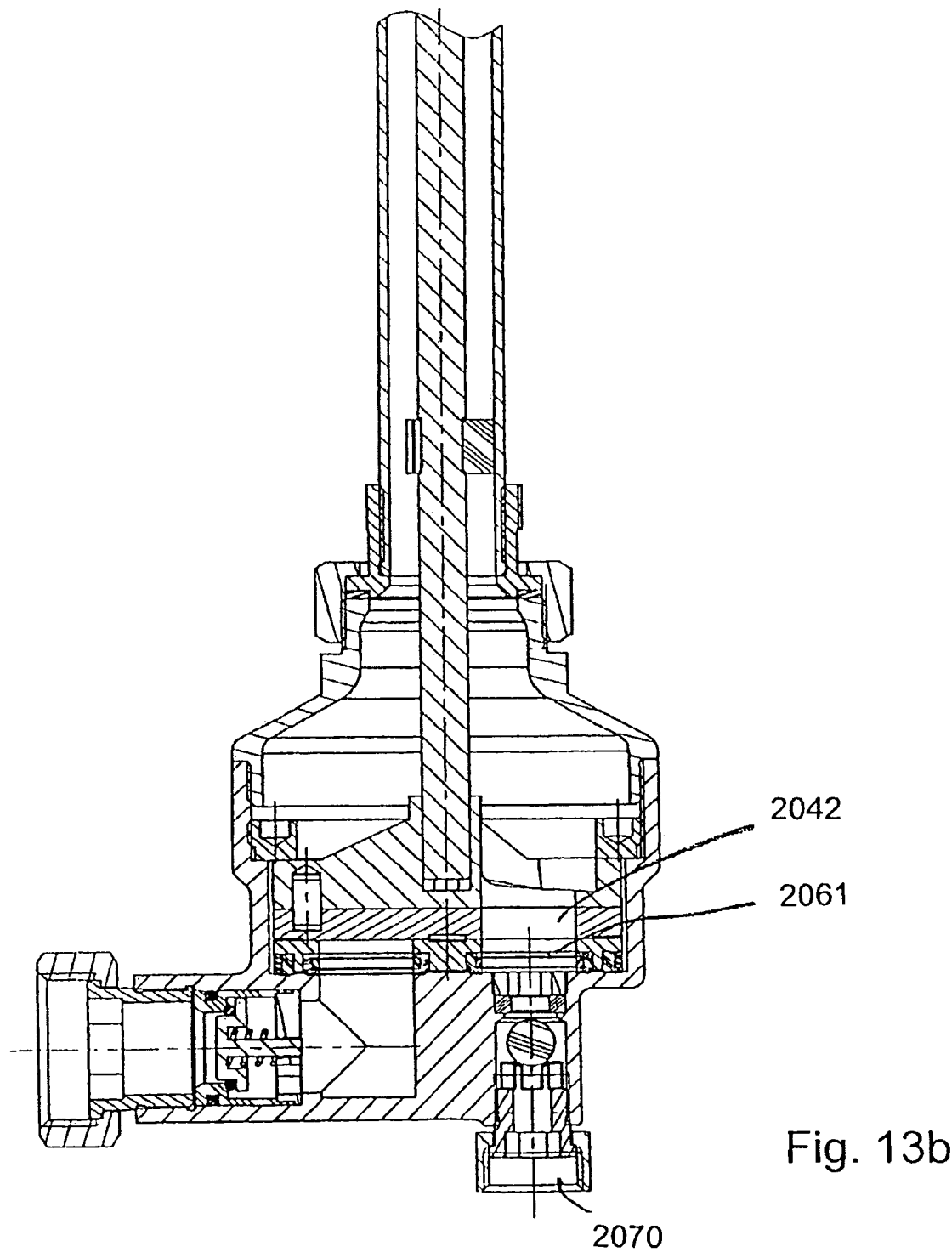
FIG. 13b shows a view corresponding to FIG. 11b in the third functional position.
Figure 13C:
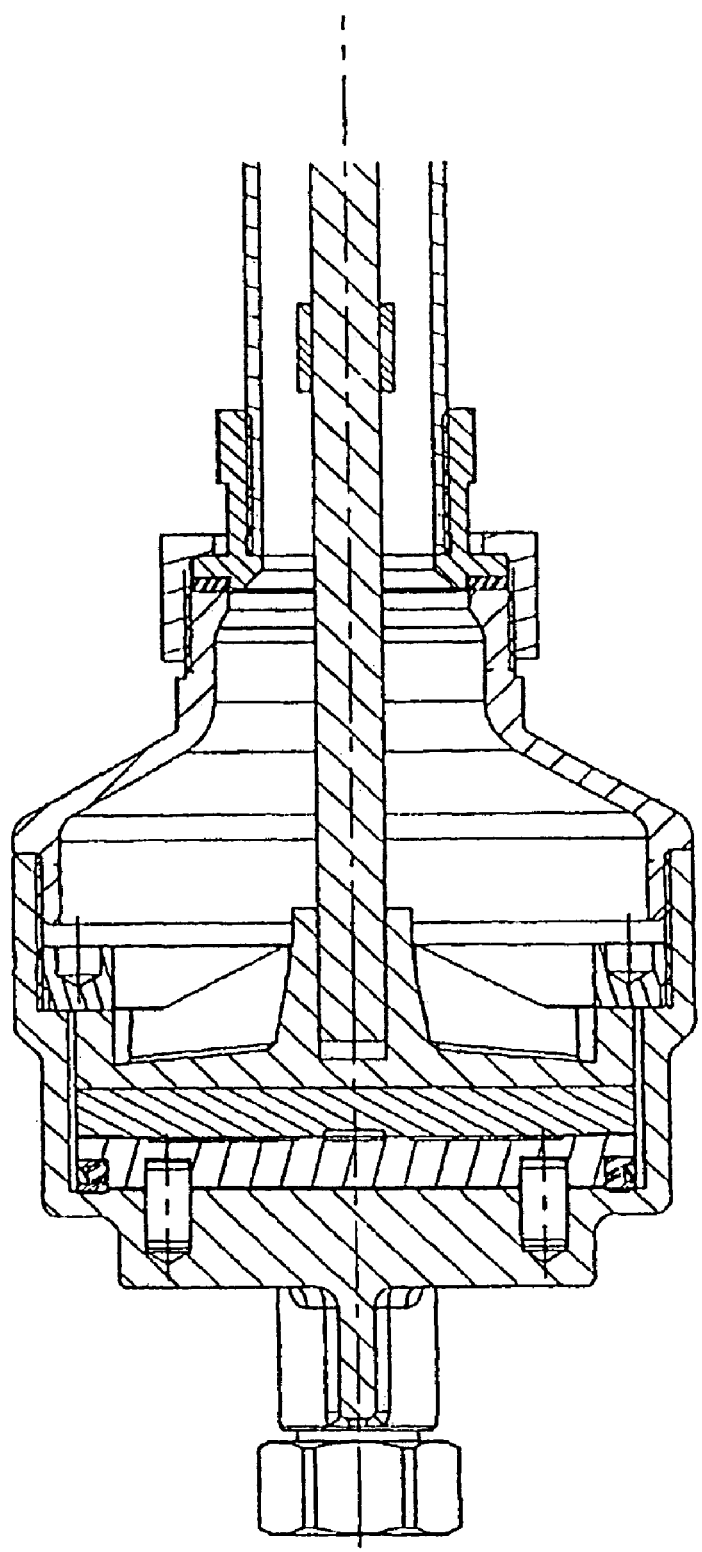
FIG. 13c shows a view corresponding to FIG. 11c in the third functional position.

FIGS. 13*a-c* depict the third embodiment in the third functional position corresponding to the "winter-closed" position. In this position, the fluid flow from the feed opening through the connecting passage to the delivery opening is interrupted and the first and second valve discs are rotated in a position, wherein the opening 2042 in the second valve disc 2045 is in fluid connection with the second eccentric opening 2061 in the first valve disc 2044, thus allowing the water within the valve arrangement, in particular within the connecting passage, to flow through the drain opening 2070.

The invention claimed is:

1. A valve arrangement for frost-resistant external operation comprising:
   a feed opening,
   a delivery opening,
   a connecting passage which connects the feed opening to the delivery opening,
   a first valve which is adapted to enable a fluid connection through the connecting passage in a first functional position and to close the fluid connection in a second functional position, and
   an actuating device for actuating the first valve,
   a second valve which is closed in the first and second functional position and which co-operates with a drain opening which is so connected to the connecting passage that in a third functional position in which the first valve is closed and the second valve is opened, the liquid in the connecting passage can flow away through the drain opening;
   wherein the first valve includes a first valve seat and a first valve body and the actuating device is connected to the first valve body by a first elastic element.

2. A valve arrangement according to claim 1, wherein the second valve is movable into the open position by the actuating device, against the elastic force of the first elastic element.

3. A valve arrangement according to claim 1, wherein the actuating device has a manually actuatable handle element which is connected to the first valve by a connecting rod extending through a part of the connecting passage.

4. A valve arrangement according to claim 1, wherein the valve arrangement is designed for installation in a horizontal ground surface and has
   an upper valve arrangement portion in which an upper connecting passage portion, the delivery opening and the actuating device are arranged, and
   a lower valve arrangement portion in which the feed opening, the drain opening and the first and second valves are arranged.

5. A valve arrangement according to claim 4 wherein the lower valve arrangement portion is so long that the feed opening in the installation position is arranged at about 80 cm deep in the ground.

6. A valve arrangement according to claim 1, wherein provided in an upper region of the valve arrangement is a venting opening which allows an access of ambient air into the connecting passage for the purposes of emptying the liquid out of the passage through the drain opening.

7. A valve arrangement according to claim 3 wherein the venting opening co-operates with a third valve which closes the venting opening when there is an increased pressure in the connecting passage.

8. A valve arrangement according claim 1, wherein a first return flow check device is arranged between the feed opening and the first valve to prevent the access of dirty water from the valve arrangement through the feed opening.

9. A valve arrangement for frost-resistant external operation comprising:
   a feed opening;
   a delivery opening;
   a connecting passage connecting the feed opening to the delivery opening;
   a first valve adapted to enable a fluid connection through the connecting passage in a first functional position and to close the fluid connection in a second functional position;
   an actuating device for actuating the first valve;
   a second valve closed in the first and second functional positions and which co-operates with a drain opening connected to the connecting passage so that in a third functional position in which the first valve is closed and the second valve is opened, the liquid in the connecting passage can flow away through the drain opening;
   wherein the second valve includes a second valve seat and a second valve body and is urged into the closed position by a second elastic element.

10. A valve arrangement for frost-resistant external operation comprising:
    a feed opening;
    a delivery opening;
    a connecting passage connecting the feed opening to the delivery opening;
    a first valve adapted to enable a fluid connection through the connecting passage in a first functional position and to close the fluid connection in a second functional position;
    an actuating device for actuating the first valve;
    a second valve closed in the first and second functional positions and which co-operates with a drain opening connected to the connecting passage so that in a third functional position in which the first valve is closed and the second valve is opened, the liquid in the connecting passage can flow away through the drain opening;
    wherein the second valve co-operates with the actuating device in such a way that it is movable into the open position by the actuating device, after the first valve has been moved into the closed position by the actuating device.

11. A valve arrangement for frost-resistant external operation comprising:
    a feed opening;
    a delivery opening;
    a connecting passage connecting the feed opening to the delivery opening;
    a first valve adapted to enable a fluid connection through the connecting passage in a first functional position and to close the fluid connection in a second functional position;
    an actuating device for actuating the first valve;
    a second valve closed in the first and second functional positions and which co-operates with a drain opening connected to the connecting passage so that in a third functional position in which the first valve is closed and the second valve is opened, the liquid in the connecting passage can flow away through the drain opening;

wherein the first valve and the second valve are rotary slide valves.

12. A valve arrangement according to claim 11 wherein the first and second valves are integrated into a single rotary slide valve.

13. A valve arrangement according to claim 12 wherein the slide valve includes a first valve element having a first through-flow opening and a second through-flow opening and a second valve element which is movable relative to the first valve element and has at least one opening for producing a fluid communication through one of the through-flow openings in the first valve element, wherein the first and second valve elements are so designed that the first through-flow opening of the first valve element is open in the first functional position, both through-flow openings of the first valve element are closed in the second functional position, and the second through-flow opening of the first valve element is open in the third functional position.

14. A valve arrangement according to claim 12 wherein the first valve element and the second valve element are at the same axial spacing relative to each other in the first and second and third functional positions.

15. A valve arrangement according to claim 12 wherein the first valve element is in the form of a disc with at least two eccentric openings.

16. A valve arrangement according to claim 15 wherein the openings have a circular, triangular or trapezoidal cross section.

17. A valve arrangement according to claim 15 wherein the two eccentric openings of the first valve element are displaced through 180° relative to each other.

18. A valve arrangement according to claim 11, wherein the slide valve has at least two valve elements of a ceramic material.

19. A valve arrangement according to claim 11 wherein the actuating device must be pivoted through about 90° in each case in order to pass from the one functional position into another functional position.

20. A valve arrangement according to claim 11 to wherein the actuating device must be pivoted through about 90° in order to pass from the first to the second functional position and must be pivoted through a further 90° in order to pass from the second to the third functional position.

21. A valve arrangement according to claim 13 wherein the second valve element is axially supported by the housing and the first valve element axially abuts against the first valve element, so that the water pressure at the feed opening axially presses the first valve element against the second valve element.

22. A valve arrangement according to claim 21 wherein the second valve element axially abuts against an annular abutment ring fixed within the housing.

23. A valve arrangement for frost-resistant external operation comprising:

a feed opening;

a delivery opening;

a connecting passage connecting the feed opening to the delivery opening;

a first valve adapted to enable a fluid connection through the connecting passage in a first functional position and to close the fluid connection in a second functional position;

an actuating device for actuating the first valve;

a second valve closed in the first and second functional positions and which co-operates with a drain opening connected to the connecting passage so that in a third functional position in which the first valve is closed and the second valve is opened, the liquid in the connecting passage can flow away through the drain opening;

wherein provided in an upper region of the valve arrangement is a venting opening which allows an access of ambient air into the connecting passage for the purposes of emptying the liquid out of the passage through the drain opening;

wherein a third valve includes a third valve seat and a third valve body and is urged into the open position by a third elastic element.

24. A valve arrangement for frost-resistant external operation comprising:

a feed opening;

a delivery opening;

a connecting passage connecting the feed opening to the delivery opening;

a first valve adapted to enable a fluid connection through the connecting passage in a first functional position and to close the fluid connection in a second functional position;

an actuating device for actuating the first valve;

a second valve closed in the first and second functional positions and which co-operates with a drain opening connected to the connecting passage so that in a third functional position in which the first valve is closed and the second valve is opened, the liquid in the connecting passage can flow away through the drain opening;

wherein a return flow check device is arranged between the drain opening and the second valve to prevent the access of dirty water from the environment into the valve arrangement.

25. A valve arrangement according to claim 24 wherein the return flow check device includes a valve float body which is adapted to float up upon access of water through the drain opening and to be pressed in sealing relationship against a valve seat.

26. A method of venting the valve arrangement for frost-resistant external operation according to claim 1, the method comprising the steps:

closing the first valve of the valve arrangement in a first functional position, which connects the feed opening to the delivery opening of the valve arrangement, opening the second valve which co-operates with the drain opening which is so connected to the connecting passage that in the second functional position the liquid in the connecting passage flows away through the drain opening.

* * * * *